US011956756B2

(12) United States Patent
Zhu et al.

(10) Patent No.: US 11,956,756 B2
(45) Date of Patent: Apr. 9, 2024

(54) REQUEST PROCESSING METHOD AND CORRESPONDING ENTITY

(71) Applicant: HUAWEI TECHNOLOGIES CO., LTD., Guangdong (CN)

(72) Inventors: Qianghua Zhu, Beijing (CN); Zheng Zhou, Beijing (CN); Chunshan Xiong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/878,537

(22) Filed: May 19, 2020

(65) Prior Publication Data
US 2020/0280958 A1 Sep. 3, 2020

Related U.S. Application Data

(63) Continuation of application No. PCT/CN2018/116204, filed on Nov. 19, 2018.

(30) Foreign Application Priority Data

Nov. 20, 2017 (CN) .......................... 201711161116.3

(51) Int. Cl.
*H04W 68/02* (2009.01)
*H04W 28/02* (2009.01)
*H04W 72/56* (2023.01)

(52) U.S. Cl.
CPC ....... *H04W 68/02* (2013.01); *H04W 28/0226* (2013.01); *H04W 72/56* (2023.01)

(58) Field of Classification Search
CPC .. H04W 68/02; H04W 28/0226; H04W 72/10
(Continued)

(56) References Cited

U.S. PATENT DOCUMENTS

2011/0286465 A1 11/2011 Koodli et al.
2014/0101303 A1 4/2014 Gupta et al.
(Continued)

FOREIGN PATENT DOCUMENTS

CN 102217275 A 10/2011
CN 106851856 A 6/2017
(Continued)

OTHER PUBLICATIONS

"3rd Generation Partnership Project; Technical Specification Group Services and System Aspects; Procedures for the 5G System; Stage 2 (Release 15)," 3GPP TS 23.502 V1.3.0, total 215 pages, 3rd Generation Partnership Project, Valbonne, France (Nov. 2017).
(Continued)

*Primary Examiner* — Chuck Huynh
(74) *Attorney, Agent, or Firm* — Leydig, Voit & Mayer, Ltd.

(57) ABSTRACT

Embodiments of this application disclose a request processing method and a corresponding entity, to control a data notification and signaling that is used for triggering paging, thereby avoiding overload of a network element in a core network. The request processing method includes: determining, by an AMF, a first control plane function entity for a terminal device; determining, by the AMF, that the terminal device enters an idle state; obtaining, by the AMF, a first reachability service invocation request from the first control plane function entity; and rejecting, by the AMF, the first reachability service invocation request when the AMF determines, based on the first reachability service invocation request, that a reachability service invocation limitation condition is satisfied.

18 Claims, 15 Drawing Sheets

(58) Field of Classification Search
USPC .................................................. 455/452.1
See application file for complete search history.

(56) References Cited

U.S. PATENT DOCUMENTS

2016/0219605 A1* 7/2016 Karlsson ............... H04W 72/10
2019/0394833 A1* 12/2019 Talebi Fard .......... H04W 60/00

FOREIGN PATENT DOCUMENTS

| | | |
|---|---|---|
| JP | 2013530581 A | 7/2013 |
| RU | 2557087 C2 | 7/2015 |
| WO | 2014015995 A1 | 1/2014 |
| WO | 2017167237 A1 | 10/2017 |

OTHER PUBLICATIONS

"Network triggered service request procedure," SA WG2 Meeting #118bis, Spokane, WA, USA, S2-170094 (was S2-17xxxx), total 8 pages, 3rd Generation Partnership Project, Valbonne, France (Jan. 16-20, 2017).

"3rd Generation Partnership Project; Technical Specification Group Services and System Aspects; System Architecture for the 5G System; Stage 2 (Release 15)," 3GPP TS 23.501 V1.5.0, total 170 pages, 3rd Generation Partnership Project, Valbonne, France (Nov. 2017).

"Service Request procedure," SA WG2 Meeting #118BIS, Spokane, WA, USA, S2-170127 (revision of S2-17xxxx), total 7 pages, 3rd Generation Partnership Project, Valbonne, France (Jan. 16-20, 2017).

"TS 23.502 pCR on Control of Messages triggering Paging at AMF," SA WG2 Meeting #124, Reno, Nevada, USA, S2-178634 (revision of S2-xxxxxx), total 14 pages, 3rd Generation Partnership Project, Valbonne, France (Nov. 27- Dec. 1, 2017).

"TS 23.502 pCR on Control of Messages triggering Paging at AMF," SA WG2 Meeting #124, Reno, Nevada, USA, S2-179395, total 14 pages, 3rd Generation Partnership Project, Valbonne, France (Nov. 27-Dec. 1, 2017).

"3rd Generation Partnership Project; Technical Specification Group Services and System Aspects; General Packet Radio Service (GPRS) enhancements for Evolved Universal Terrestrial Radio Access Network (E-UTRAN) access (Release 15)," 3GPP TS 23.401 V15.1.0, total 397 pages, 3rd Generation Partnership Project, Valbonne, France (Sep. 2017).

RU/2020120061, Office Action/Search Report, dated Oct. 28, 2021.

J. Kim et al., "3GPP SA2 architecture and functions for 5G mobile communication system," ICT Express 3, total 8 pages (Mar. 2017).

* cited by examiner

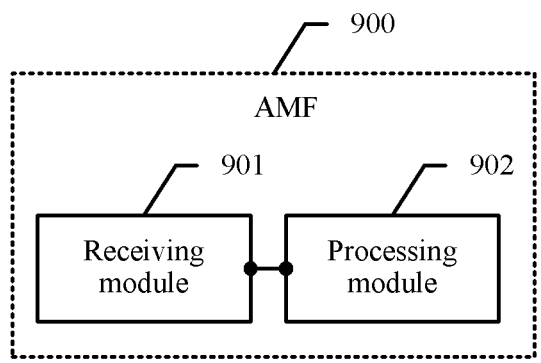
FIG. 9-a
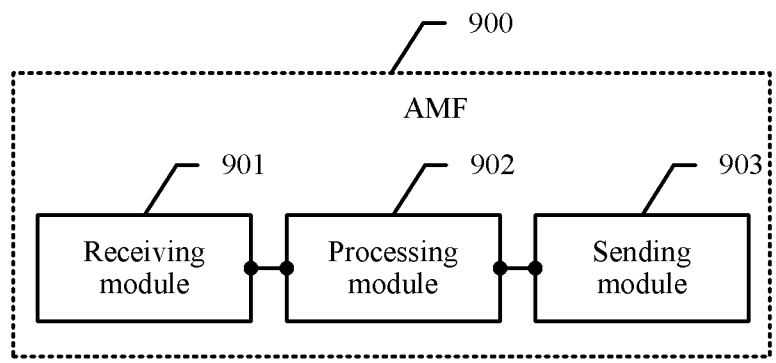
FIG. 9-b
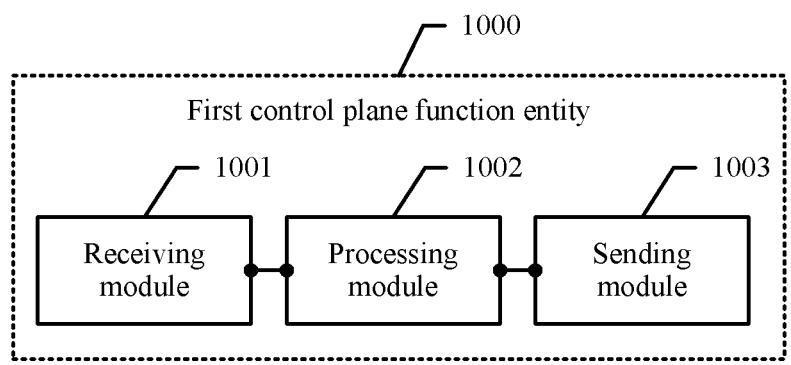
FIG. 10

REQUEST PROCESSING METHOD AND CORRESPONDING ENTITY

CROSS-REFERENCE TO RELATED APPLICATIONS

This application is a continuation of International Application No. PCT/CN2018/116204, filed on Nov. 19, 2018, which claims priority to Chinese Patent Application No. 201711161116.3, filed on Nov. 20, 2017. The disclosures of the aforementioned applications are hereby incorporated by reference in their entireties.

TECHNICAL FIELD

This application relates to the field of communications technologies, and in particular, to a request processing method and a corresponding entity.

BACKGROUND

Currently, mobile networks that can be accessed by user equipment (UE) include a 2nd generation mobile communications (2G) system, a 3rd generation mobile communications (3G) system, and a 4th generation mobile communications (4G) system. These mobile networks provide service data transmission channels for a call service, a video service, a web page service, and the like of the UE. However, explosive development of new services such as the internet of vehicles, virtual reality, mobile office, and the internet of things requires a mobile network to provide the following same services in a plurality of scenarios: a fiber-like access rate, zero-latency use experience, connection capabilities of hundreds of billions of devices, an ultra-high traffic density, an ultra-high connection density, ultra-high mobility, and the like. However, intelligent optimization of services and user perception, energy efficiency improvement of over 100 times, and bit costs reduction of over 100 times are difficult to implement in a conventional mobile network, and rapid development of future services cannot be ensured.

A status of UE registered with a mobile network may include an idle state and a connected state. The network may learn of a registration area, namely, a tracking area list (TAL), in which the UE in the idle state is located. If the network needs to send data to the UE, the network first needs to send a paging request to all base stations in the TAL in which the UE is located. The base station pages the UE, and the UE sends a service registration request and enters the connected state.

In a conventional mobile network, to control load of a mobility management entity (MME) and a paging procedure in a base station (eNodeB), the MME cannot simultaneously process more than two downlink data notification (DDN) requests for one UE. Such a limitation on a quantity of DDNs is first applied to a multimedia priority service (MPS), but another service should not cause the quantity of DDNs of the UE to exceed an indicator. For example, in a conventional evolved packet system (EPS), DDN allocation is controlled by a serving gateway (SGW). In the EPS, one UE can have only one SGW serving the UE. Therefore, the SGW can no longer generate another DDN after detecting that there are already two DDNs of the UE, thereby controlling paging load on the MME.

In a 5th generation mobile communications (5G) system, how to avoid overload of a network element in a core network caused by an excessive quantity of DDNs in a network or an excessive amount of signaling used for triggering paging is an urgent problem to be resolved.

SUMMARY

Embodiments of this application provide a request processing method and a corresponding entity, to control a data notification and signaling that is used for triggering paging, thereby avoiding overload of a network element in a core network.

To resolve the foregoing technical problem, the embodiments of this application provide the following technical solutions:

According to a first aspect, an embodiment of this application provides a request processing method, including: determining, by an access and mobility management function entity AMF, a first control plane function entity for a terminal device; determining, by the AMF, that the terminal device enters an idle state; obtaining, by the AMF, a first reachability service invocation request from the first control plane function entity; and rejecting, by the AMF, the first reachability service invocation request when the AMF determines, based on the first reachability service invocation request, that a reachability service invocation limitation condition is satisfied.

In this embodiment of this application, after obtaining the first reachability service invocation request, the AMF may determine, based on the first reachability service invocation request, whether the reachability service invocation limitation condition is satisfied. When the AMF determines, based on the first reachability service invocation request, that the reachability service invocation limitation condition is satisfied, the AMF cannot provide a reachability service, and the AMF may reject the first reachability service invocation request. In this embodiment of this application, by using the reachability service invocation limitation condition used by the AMF, the AMF may determine, based on the first reachability service invocation request, whether the reachability service invocation limitation condition is satisfied. In this way, in this embodiment of this application, the AMF may be used to resolve a data notification coordination problem related to the first control plane function entity, to control a data notification and signaling that is used for triggering paging, thereby avoiding overload of a network element in a core network.

In a possible design of the first aspect of this application, the reachability service invocation limitation condition includes at least one of the following conditions: a reachability service invocation count limitation condition, a reachability service invocation frequency limitation condition, a service attribute limitation condition, a user configuration limitation condition, and a reachability service invocation-limited time period condition. In this embodiment of this application, the reachability service invocation count limitation condition is a limited reachability service invocation count that is set for the terminal device. It may be determined, based on the reachability service invocation count limitation condition, whether the first reachability service invocation request satisfies the limited reachability service invocation count. The reachability service invocation frequency limitation condition is limited reachability service invocation frequency that is set for the terminal device. The service attribute limitation condition is a limitation, set for the terminal device, of reachability service invocation on a service attribute of downlink data. The user configuration limitation condition is a limitation, set for the terminal device, of reachability service invocation on a user configuration. It may be determined, based on the user configuration limitation condition, whether a user configuration corresponding to the first reachability service invocation request satisfies a limitation of reachability service invocation on the user configuration. The reachability service invocation-limited time period condition is a time period within which reachability service invocation is limited and that is set for the terminal device. It may be determined, based on the reachability service invocation-limited time period condition, whether a request time of the first reachability service invocation request falls within the limited time period.

In a possible design of the first aspect of this application, the reachability service invocation limitation condition further includes a priority level limitation condition for an allocation retention priority ARP. The AMF may also set a priority level limitation on the ARP. If an ARP carried in the first reachability service invocation request satisfies the priority level limitation condition for the ARP, the AMF may reject the first reachability service invocation request.

In a possible design of the first aspect of this application, the first reachability service invocation request includes a first ARP; and the rejecting, by the AMF, the first reachability service invocation request when the AMF determines, based on the first reachability service invocation request, that a reachability service invocation limitation condition is satisfied includes: obtaining, by the AMF, a second reachability service invocation request from a second control plane function entity, where the second reachability service invocation request includes a second ARP, and the second control plane function entity is another control plane function entity that is different from the first control plane function entity and that is determined by the AMF for the terminal device; and rejecting, by the AMF, the first reachability service invocation request when a priority level of the second ARP is higher than a priority level of the first ARP. In this embodiment of this application, the AMF separately obtains two reachability service invocation requests, and the two reachability service invocation requests respectively carry the first ARP and the second ARP. In this case, the AMF may compare priority levels of the ARPs. The AMF accepts only a reachability service invocation request corresponding to an ARP with a higher priority level, and the AMF rejects a reachability service invocation request corresponding to an ARP with a lower priority level. In this way, the AMF can control reachability service invocation based on the priority level limitation condition for the ARP.

In a possible design of the first aspect of this application, the first reachability service invocation request includes a first ARP; the priority level limitation condition for the ARP includes: not higher than a highest priority level of an ARP of a reachability service invocation request processed by the AMF; and the rejecting, by the AMF, the first reachability service invocation request when the AMF determines, based on the first reachability service invocation request, that a reachability service invocation limitation condition is satisfied includes: rejecting, by the AMF, the first reachability service invocation request when a priority level of the first ARP is lower than or equal to the highest priority level of the ARP of the processed reachability service invocation request. The AMF accepts only a reachability service invocation request corresponding to an ARP with a priority level higher than the highest priority level. The AMF rejects a reachability service invocation request corresponding to an ARP with a priority level not higher than the highest priority level. In this way, the AMF can control reachability service invocation based on the priority level limitation condition for the ARP.

In a possible design of the first aspect of this application, the rejecting, by the AMF, the first reachability service invocation request includes: sending, by the AMF, a reachability service invocation reject message to the first control plane function entity. The AMF may reject the first reachability service invocation request by returning a reject message, so that the first control plane function entity can determine, based on the received reachability service invocation reject message, that the AMF rejects the current request. Unlimitedly, the AMF may reject the first reachability service invocation request in a plurality of manners. For example, the AMF does not respond to the first reachability service invocation request, and consequently the first control plane function entity cannot receive a response from the AMF. In this case, the first control plane function entity may also determine that the AMF rejects the current request. For example, the AMF does not respond to the first reachability service invocation request within five seconds, and if the first control plane function entity receives no response from the AMF within five seconds, the first control plane function entity may also determine that the AMF rejects the current request.

In a possible design of the first aspect of this application, the reachability service invocation reject message includes at least one of the following information: information indicating that a limited reachability service invocation count is equal to 0, information about a first time period, limit over indication information, and information about the highest priority level of the ARP of the reachability service invocation request processed by the AMF, where the information about the first time period is used to indicate that the first control plane function entity shall not send a reachability service invocation request within the first time period. The reachability service invocation limitation condition may be specifically a reachability service invocation count limitation condition. If a limited reachability service invocation count indicated by the reachability service invocation count limitation condition is equal to 0, the AMF may determine, by using the reachability service invocation reject message, that a value of the limited reachability service invocation count is 0. In addition, the AMF may alternatively add a first time period to a field of the reachability service invocation reject message. The first control plane function entity receives the reachability service invocation reject message, and parses out a value of the first time period, and according to an indication of the AMF, the first control plane function entity shall not send a reachability service invocation request within the first time period. In addition, the AMF may add a limit over indication to the reachability service invocation reject message. The first control plane function entity receives the reachability service invocation reject message, and parses out the limit over indication.

In a possible design of the first aspect of this application, the method further includes: sending, by the AMF, a notification message to a third control plane function entity, where the notification message includes at least one of the following information: information indicating that a limited reachability service invocation count is equal to 0, information about a first time period, limit over indication information, and information about the highest priority level of the ARP of the reachability service invocation request processed by the AMF, where the information about the first time period is used to indicate that the first control plane function entity shall not send a reachability service invocation request within the first time period, and the third control plane function entity is another control plane function entity that is different from the first control plane function entity and that is determined by the AMF for the terminal device. The third control plane function entity may determine, by using the reachability service invocation reject message, a manner in which the AMF controls a reachability service invocation request. For example, the third control plane function entity may determine whether a DDN can still be generated or whether a short message service message notification can be generated. Therefore, the AMF can control, by using the notification message, a data notification and signaling that is used for triggering paging, thereby avoiding overload of a network element in a core network.

In a possible design of the first aspect of this application, the method further includes: accepting, by the AMF, the first reachability service invocation request when the AMF determines, based on the first reachability service invocation request, that the reachability service invocation limitation condition is not satisfied. The AMF may determine whether the reachability service invocation limitation condition is satisfied. The reachability service invocation limitation condition is a condition that needs to be satisfied by reachability service invocation. The AMF accepts the reachability service invocation request only when the reachability service invocation limitation condition is not satisfied. After accepting the first reachability service invocation request, the AMF may page the terminal device. After the terminal device is successfully paged, a UPF may send downlink data to the terminal device.

In a possible design of the first aspect of this application, the accepting, by the AMF, the first reachability service invocation request includes: sending, by the AMF, a reachability service invocation accept message to the first control plane function entity. The AMF may accept the first reachability service invocation request by returning an accept message. Different message identifiers may be used for the reachability service invocation accept message and the reachability service invocation reject message, so that the first control plane function entity can learn, by determining a message identifier, that the AMF sends the reachability service invocation accept message, and the first control plane function entity determines, based on the reachability service invocation accept message, that the AMF accepts the current request.

In a possible design of the first aspect of this application, the reachability service invocation accept message includes information about a remaining reachability service invocation count, and/or information about a highest priority level of an ARP of a reachability service invocation request processed by the AMF, where the information about the remaining reachability service invocation count is obtained through calculation by the AMF based on a limited reachability service invocation count and the first reachability service invocation request. The first control plane function entity may determine, based on the information about the remaining reachability service invocation count, and/or the information about the highest priority level of the ARP of the reachability service invocation request processed by the AMF, whether a DDN can continue to be used. If a reachability service invocation request generated by the first control plane function entity does not satisfy the information about the remaining reachability service invocation count, and/or the information about the highest priority level of the ARP of the reachability service invocation request processed by the AMF, the first control plane function entity may send the request to the AMF.

In a possible design of the first aspect of this application, the method further includes: obtaining, by the AMF, a status update message of the terminal device, where the status update message includes: the terminal device enters a connected state, or the terminal device is unsuccessfully paged; and sending, by the AMF, the status update message to the first control plane function entity. The AMF may further monitor a status of the terminal device in real time. If the terminal device enters the connected state, or the terminal device is unsuccessfully paged, the AMF may send the status update message to the first control plane function entity, so that the first control plane function entity may obtain a latest status of the terminal device.

In a possible design of the first aspect of this application, the method further includes: sending, by the AMF, the status update message to a third control plane function entity, where the third control plane function entity is another control plane function entity that is different from the first control plane function entity and that is determined by the AMF for the terminal device. The third control plane function entity is a control plane function entity that does not send a reachability service invocation request to the AMF. The third control plane function entity may also receive the status update message from the AMF. The third control plane function entity may determine the latest status of the terminal device by parsing the status update message.

In a possible design of the first aspect of this application, the reachability service invocation limitation condition is determined according to a local configuration policy of the AMF; or the reachability service invocation limitation condition is determined by using reachability service invocation limitation information received by the AMF from a policy control function entity PCF. The AMF may determine the reachability service invocation limitation condition according to the configuration policy of the network element. Alternatively, a communication connection is established between the AMF and the PCF in the core network. The PCF may store the reachability service invocation limitation condition. The PCF may send the reachability service invocation limitation information to the AMF. The AMF receives the reachability service invocation limitation information, so that the AMF can obtain the reachability service invocation limitation condition. The AMF may determine, based on an implementation scenario, a manner of obtaining the reachability service invocation limitation condition.

According to a second aspect, an embodiment of this application provides a request processing method, including: obtaining, by a first control plane function entity, a data notification; generating, by the first control plane function entity, a first reachability service invocation request based on the data notification and a historical reachability service invocation limitation condition stored in the first control plane function entity; and sending, by the first control plane function entity, the first reachability service invocation request to an access and mobility management function entity AMF.

In this embodiment of this application, the first control plane function entity may send the first reachability service invocation request to the AMF. Therefore, the AMF may determine, based on the first reachability service invocation request, whether a reachability service invocation limitation condition is satisfied. When the AMF determines, based on the first reachability service invocation request, that the reachability service invocation limitation condition is satisfied, the AMF cannot provide a reachability service, and the AMF may reject the first reachability service invocation request. In this embodiment of this application, by using the reachability service invocation limitation condition used by the AMF, the AMF may determine, based on the first reachability service invocation request, whether the reachability service invocation limitation condition is satisfied. In this way, in this embodiment of this application, the AMF may be used to resolve a data notification coordination problem related to the first control plane function entity, to control a data notification and signaling that is used for triggering paging, thereby avoiding overload of a network element in a core network.

In a possible design of the second aspect of this application, after the sending, by the first control plane function entity, the first reachability service invocation request to an access and mobility management function entity AMF, the method further includes: receiving, by the first control plane function entity, a reachability service invocation reject message or a reachability service invocation accept message from the AMF; and updating, by the first control plane function entity, the historical reachability service invocation limitation condition based on the reachability service invocation reject message or the reachability service invocation accept message.

In a possible design of the second aspect of this application, the reachability service invocation reject message includes at least one of the following information: information indicating that a limited reachability service invocation count is equal to 0, information about a first time period, limit over indication information, and information about a highest priority level of a reachability service invocation request processed by the AMF, where the information about the first time period is used to indicate that the first control plane function entity shall not send a reachability service invocation request within the first time period; and the reachability service invocation accept message includes information about a remaining reachability service invocation count, and/or information about a highest priority level of an ARP of a reachability service invocation request processed by the AMF.

In a possible design of the second aspect of this application, the method further includes: receiving, by the first control plane function entity, a status update message from the AMF, where the status update message includes: the terminal device enters a connected state, or the terminal device is unsuccessfully paged. The AMF may further monitor a status of the terminal device in real time. If the terminal device enters the connected state, or the terminal device is unsuccessfully paged, the AMF may send the status update message to the first control plane function entity, so that the first control plane function entity may obtain a latest status of the terminal device.

According to a third aspect, an embodiment of this application provides an access and mobility management function entity AMF, including: a processing module, configured to determine a first control plane function entity for a terminal device, where the processing module is configured to determine that the terminal device enters an idle state; and a receiving module, configured to obtain a first reachability service invocation request from the first control plane function entity, where the first reachability service invocation request is used to request the AMF to page the terminal device that enters the idle state, where the processing module is configured to reject the first reachability service invocation request when the AMF determines, based on the first reachability service invocation request, that a reachability service invocation limitation condition is satisfied.

In a possible design of the third aspect of this application, the reachability service invocation limitation condition includes at least one of the following conditions: a reachability service invocation count limitation condition, a reachability service invocation frequency limitation condition, a service attribute limitation condition, a user configuration limitation condition, and a reachability service invocation-limited time period condition.

In a possible design of the third aspect of this application, the reachability service invocation limitation condition further includes a priority level limitation condition for an allocation retention priority ARP.

In a possible design of the third aspect of this application, the first reachability service invocation request includes a first ARP; the receiving module is further configured to obtain a second reachability service invocation request from the second control plane function entity, where the second reachability service invocation request includes a second ARP, and the second control plane function entity is another control plane function entity that is different from the first control plane function entity and that is determined by the AMF for the terminal device; and the processing module is further configured to reject the first reachability service invocation request when a priority level of the second ARP is higher than a priority level of the first ARP.

In a possible design of the third aspect of this application, the first reachability service invocation request includes a first ARP; the priority level limitation condition for the ARP includes: not higher than a highest priority level of an ARP of a reachability service invocation request processed by the AMF; and the processing module is specifically configured to reject the first reachability service invocation request when a priority level of the first ARP is lower than or equal to the highest priority level of the ARP of the processed reachability service invocation request.

In a possible design of the third aspect of this application, the processing module is specifically configured to send a reachability service invocation reject message to the first control plane function entity.

In a possible design of the third aspect of this application, the reachability service invocation reject message includes at least one of the following information: information indicating that a limited reachability service invocation count is equal to 0, information about a first time period, limit over indication information, and information about the highest priority level of the ARP of the reachability service invocation request processed by the AMF, where the information about the first time period is used to indicate that the first control plane function entity shall not send a reachability service invocation request within the first time period.

In a possible design of the third aspect of this application, the AMF further includes: a sending module, configured to send a notification message to a third control plane function entity, where the notification message includes at least one of the following information: information indicating that a limited reachability service invocation count is equal to 0, information about a first time period, limit over indication information, and information about the highest priority level of the ARP of the reachability service invocation request processed by the AMF, where the information about the first time period is used to indicate that the first control plane function entity shall not send a reachability service invocation request within the first time period, and the third control plane function entity is another control plane function entity that is different from the first control plane function entity and that is determined by the AMF for the terminal device.

In a possible design of the third aspect of this application, the processing module is configured to accept the first reachability service invocation request when the AMF determines, based on the first reachability service invocation request, that the reachability service invocation limitation condition is not satisfied.

In a possible design of the third aspect of this application, the processing module is specifically configured to send a reachability service invocation accept message to the first control plane function entity.

In a possible design of the third aspect of this application, the reachability service invocation accept message includes information about a remaining reachability service invocation count, and/or information about a highest priority level of an ARP of a reachability service invocation request processed by the AMF, where the information about the remaining reachability service invocation count is obtained through calculation by the AMF based on a limited reachability service invocation count and the first reachability service invocation request.

In a possible design of the third aspect of this application, the AMF further includes a sending module, where the receiving module is further configured to obtain a status update message of the terminal device, where the status update message includes: the terminal device enters a connected state, or the terminal device is unsuccessfully paged; and the sending module is configured to send the status update message to the first control plane function entity.

In a possible design of the third aspect of this application, the sending module is further configured to send the status update message to a third control plane function entity, where the third control plane function entity is another control plane function entity that is different from the first control plane function entity and that is determined by the AMF for the terminal device.

In a possible design of the third aspect of this application, the reachability service invocation limitation condition is determined according to a local configuration policy of the AMF; or the reachability service invocation limitation condition is determined by using reachability service invocation limitation information received by the AMF from a policy control function entity PCF.

In a fourth aspect of this application, composition modules of a UPF may further perform the steps described in the first aspect and the possible implementations. For details, refer to the descriptions of the first aspect and the possible implementations.

According to a fourth aspect, an embodiment of this application provides a control plane function entity, where the control plane function entity is specifically a first control plane function entity, and the first control plane function entity includes: a receiving module, configured to obtain a data notification; a processing module, configured to generate a first reachability service invocation request based on the data notification and a historical reachability service invocation limitation condition stored in the first control plane function entity; and a sending module, configured to send the first reachability service invocation request to an access and mobility management function entity AMF.

In a possible design of the fourth aspect of this application, the receiving module is further configured to: after the sending module sends the first reachability service invocation request to the access and mobility management function entity AMF, receive a reachability service invocation reject message or a reachability service invocation accept message from the AMF; and the processing module is further configured to update the historical reachability service invocation limitation condition based on the reachability service invocation reject message or the reachability service invocation accept message.

In a possible design of the fourth aspect of this application, the reachability service invocation reject message includes at least one of the following information: information indicating that a limited reachability service invocation count is equal to 0, information about a first time period, limit over indication information, and information about a highest priority level of an ARP of a reachability service invocation request processed by the AMF, where the information about the first time period is used to indicate that the first control plane function entity shall not send a reachability service invocation request within the first time period; and the reachability service invocation accept message includes information about a remaining reachability service invocation count, and/or information about a highest priority level of an ARP of a reachability service invocation request processed by the AMF.

In a possible design of the fourth aspect of this application, the receiving module is further configured to receive a status update message from the AMF, where the status update message includes: the terminal device enters a connected state, or the terminal device is unsuccessfully paged.

In the fourth aspect of this application, the composition modules of the first control plane function entity may further perform the steps described in the second aspect and the possible implementations. For details, refer to the descriptions of the second aspect and the possible implementations.

According to a fifth aspect, an embodiment of this application provides a downlink data notification processing method, including: receiving, by a user plane function entity UPF from a data network DN, first downlink data that needs to be sent to a terminal device; generating, by the UPF, a first DDN message based on the first downlink data and a historical reachability service invocation limitation condition; and sending, by the UPF, the first DDN message to a first control plane function entity.

In a possible design of the fifth aspect of this application, the first DDN message further includes an allocation retention priority ARP corresponding to the terminal device.

In a possible design of the fifth aspect of this application, after the sending, by the UPF, the first DDN message to a first control plane function entity, the method further includes: receiving, by the UPF, a notification message from the first control plane function entity, where the notification message includes: the first control plane function entity does not allow generation of a DDN message.

In a possible design of the fifth aspect of this application, after the sending, by the UPF, the first DDN message to a first control plane function entity, the method further includes: receiving, by the UPF, a reachability service invocation reject message or a reachability service invocation accept message from the first control plane function entity; and updating, by the UPF, the historical reachability service invocation limitation condition based on the reachability service invocation reject message or the reachability service invocation accept message.

In a possible design of the fifth aspect of this application, the reachability service invocation reject message includes at least one of the following information: information indicating that a limited reachability service invocation count is equal to 0, information about a first time period, limit over indication information, and information about a highest priority level of an ARP of a reachability service invocation request processed by the AMF, where the information about the first time period is used to indicate that the first control plane function entity shall not send a reachability service invocation request within the first time period; and the reachability service invocation accept message includes information about a remaining reachability service invocation count, and/or information about a highest priority level of an ARP of a reachability service invocation request processed by the AMF.

In a possible design of the fifth aspect of this application, the method further includes: receiving, by the UPF from the DN, second downlink data that needs to be sent to the terminal device; and rejecting, by the UPF, the second downlink data based on the reachability service invocation reject message.

According to a sixth aspect, an embodiment of this application provides a computer-readable storage medium, where the computer-readable storage medium stores an instruction, and when the instruction runs on a computer, the computer is enabled to perform the method according to each of the foregoing aspects.

According to a seventh aspect, an embodiment of this application provides a computer program product including an instruction, where when the computer program product runs on a computer, the computer is enabled to perform the method according to each of the foregoing aspects.

According to an eighth aspect, an embodiment of this application provides a communications apparatus, where the communications apparatus may include an entity such as an access and mobility management function entity or a control plane function entity. The communications apparatus includes a processor and a memory. The memory is configured to store an instruction. The processor is configured to execute the instruction in the memory, so that the communications apparatus performs the method according to either of the first aspect or the second aspect.

According to a ninth aspect, this application provides a chip system. The chip system includes a processor, configured to support an access and mobility management function entity or a control plane function entity in implementing a function in the foregoing aspects, for example, sending or processing data and/or information in the foregoing methods. In a possible design, the chip system further includes a memory. The memory is configured to store a program instruction and data that are necessary for the access and mobility management function entity or the control plane function entity. The chip system may include a chip, or may include a chip and another discrete device.

BRIEF DESCRIPTION OF DRAWINGS

FIG. 9-*a* is a schematic structural composition diagram of an AMF according to an embodiment of this application;

FIG. 9-*b* is a schematic structural composition diagram of another AMF according to an embodiment of this application;

FIG. 10 is a schematic structural composition diagram of a first control plane function entity according to an embodiment of this application;

DESCRIPTION OF EMBODIMENTS

Embodiments of this application provide a request processing method and a corresponding entity, to control a data notification and signaling that is used for triggering paging, thereby avoiding overload of a network element in a core network.

The following describes the embodiments of this application with reference to accompanying drawings.

In the specification, claims, and accompanying drawings of this application, the terms "first", "second", and so on are intended to distinguish between similar objects but do not necessarily indicate a specific order or sequence. It should be understood that the terms used in such a way are interchangeable in proper circumstances. This is merely a discrimination manner that is used when objects having a same attribute are described in the embodiments of this application. In addition, the terms "including", "having", and any other variants mean to cover the non-exclusive inclusion, so that a process, method, system, product, or device that includes a series of units is not necessarily limited to those units, but may include other units not expressly listed or inherent to such a process, method, system, product, or device.

Details are described below separately.

Figure 1:
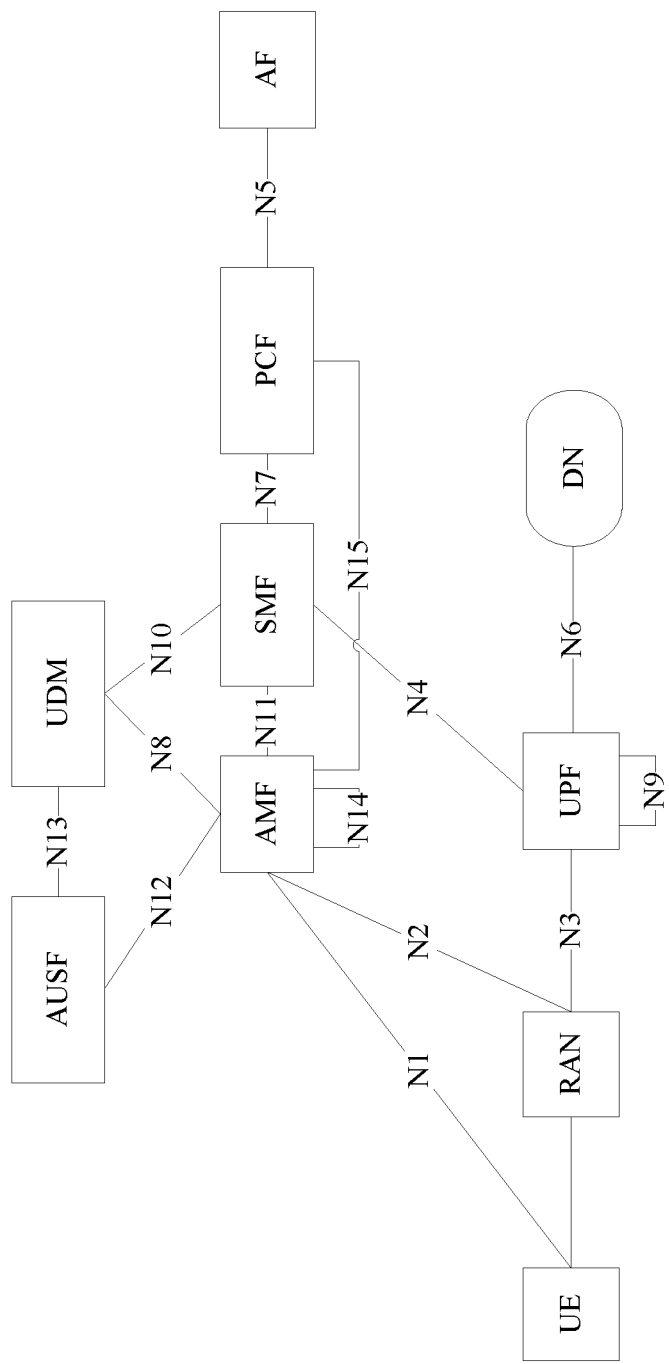
FIG. 1 is a schematic diagram of a system architecture to which a request processing method is applied according to an embodiment of this application.

The request processing method provided in the embodiments of this application may be applied to a 5G system. In the 5G system, a core network user plane includes a user plane function entity (UPF) and a radio access network (RAN), and a core network control plane includes an access and mobility management function entity (AMF) and a session management function entity (SMF). FIG. 1 is a schematic diagram of a system architecture of a 5G system according to an embodiment of this application. The architecture of the 5G system is divided into two parts: an access network and a core network. The access network is used to implement a function related to wireless access, and the access network includes a RAN. The core network mainly includes the following several key logical network elements: an AMF, an SMF, a UPF, a policy control function entity (PCF), a unified data management entity (UDM), an application function (AF) network element, and an authentication server function (AUSF).

The AMF is responsible for UE access management and mobility management in a mobile network, such as a user location update, network registration of a user, and user switching.

The SMF is responsible for session management in the mobile network. For example, specific functions of the SMF may include assigning an internet protocol (IP) address to a user, and selecting a UPF providing a packet forwarding function.

The UPF is configured to forward a user data packet according to a routing rule of the SMF, and is responsible for processing a user packet, such as forwarding or charging.

The PCF is responsible for providing a policy, such as a quality of service (QoS) policy or a slice selection policy, for the AMF or the SMF.

The UDM is configured to store user subscription information, and manage a user subscription context.

The AUSF is configured to perform UE security authentication.

The AF is configured to manage a user application.

The 5G system may further include user equipment (UE) and a data network (DN). The UE is a network terminal device, such as a mobile phone or an internet-of-things terminal device. The UE establishes an LADN packet data unit (PDU) session between the UE and the RAN, between the RAN and the UPF, and between the UPF and the DN. The UE may access the data network by using the LADN PDU session.

The request processing method provided in the embodiments of this application may be applied to the access and mobility management function entity AMF or another network device having an access and mobility management function in the 5G system. The request processing method provided in the embodiments of this application may be applied to a control plane function entity. The control plane function entity may be specifically a control plane network element in the 5G system, for example, may be specifically one of an SMF, a PCF, a short message service function entity (SMSF), and a UDM.

In the embodiments of this application, UE registered with a mobile network has three states: an idle state, a connected state, and an inactive (in-active) state. The network may learn of a registration area, namely, a tracking area list (TAL), in which the UE in the idle state is located. If the network needs to send data to the UE, the network first needs to send a paging request to all base stations in the TAL in which the UE is located. The base station pages the UE, and the UE sends a service registration request and enters the connected state. The network learns of an AMF to which the UE in the connected state is connected, and may directly send service data to the UE. For the UE in the in-active state, the network may complete a location management function and a reachability management function by using the AMF, such as paging of the UE or data buffering.

Figure 2:
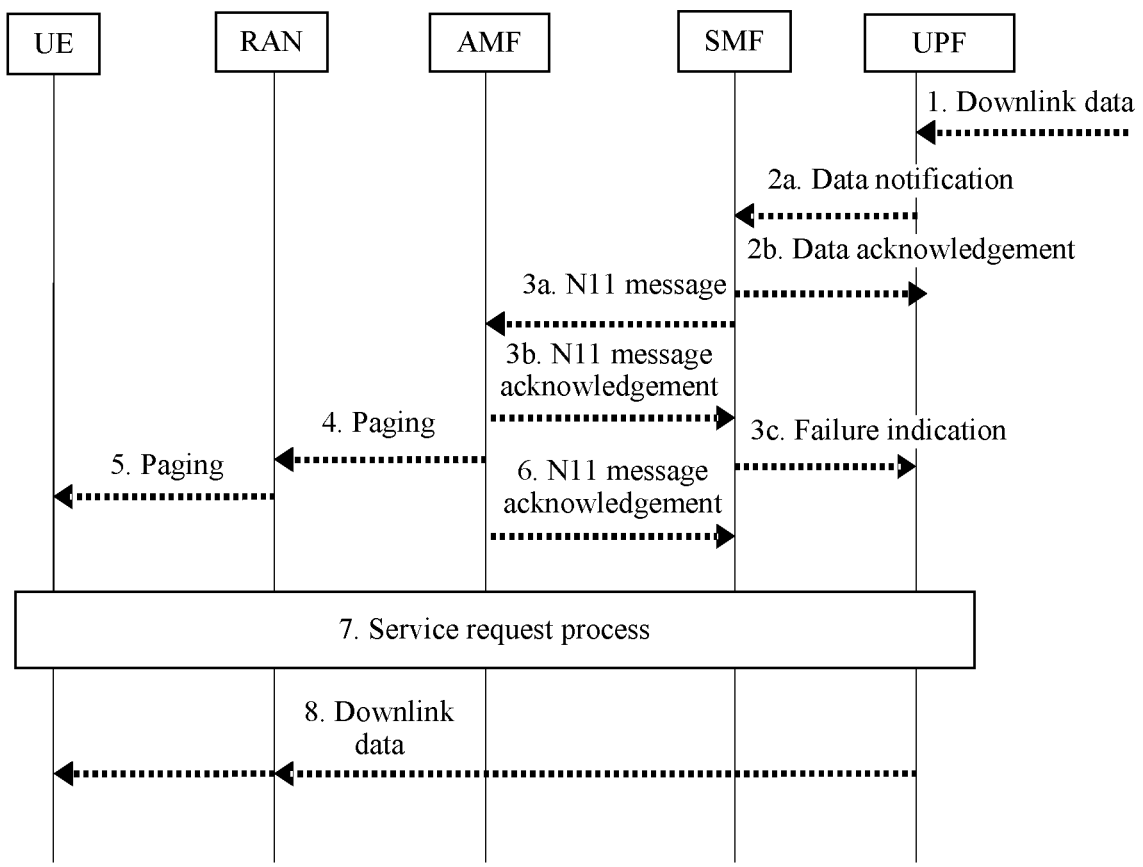
FIG. 2 is a schematic diagram of a network-triggered service request procedure according to an embodiment of this application.

FIG. 2 shows a network-triggered service request procedure, and the service request procedure is mainly related to a UPF, an SMF, and an AMF. The SMF and the UPF are merely an example. In another implementation scenario, the service request procedure is related to an AMF and a PCF.

Interaction between the SMF and the AMF is used as an example below. The service request procedure mainly includes the following steps.

1. The UPF receives downlink data.
2a. The UPF sends a data notification to the SMF.
2b. The SMF sends a data acknowledgement to the UPF.
3a. The SMF sends an N11 message to the AMF.
3b. The AMF sends an N11 message acknowledgement to the SMF.
3c. The SMF sends a failure indication to the UPF.
4. The AMF pages UE from a RAN.
5. The RAN pages the UE.
6. The AMF sends an N11 message acknowledgement to the SMF.
7. Perform service request process.
8. The UPF sends the downlink data to the UE through the RAN.

The foregoing process mainly occurs in a scenario in which the UE is in an idle state when the network has downlink data for the UE. The SMF is notified by using processes in step 2a and step 2b. The SMF sends a UE reachability invocation request to the AMF by using step 3a or step 3b. The AMF sends a paging command to each RAN in a TA list. The RAN pages the UE by using step 5. The UE performs the network-triggered service request procedure shown in FIG. 2, that is, step 7. Subsequently, in step 8, paging of the UE is stopped, and finally, the UPF transmits the downlink data for the UE. If the AMF finds that the UE is unreachable, or the UE can be paged only for a regulatory service but cannot be commonly paged, the AMF needs to notify the SMF of this case. The SMF notifies the UPF that UE paging fails, and the UPF starts a data processing policy, and temporarily buffers or discards the data.

Figure 3:
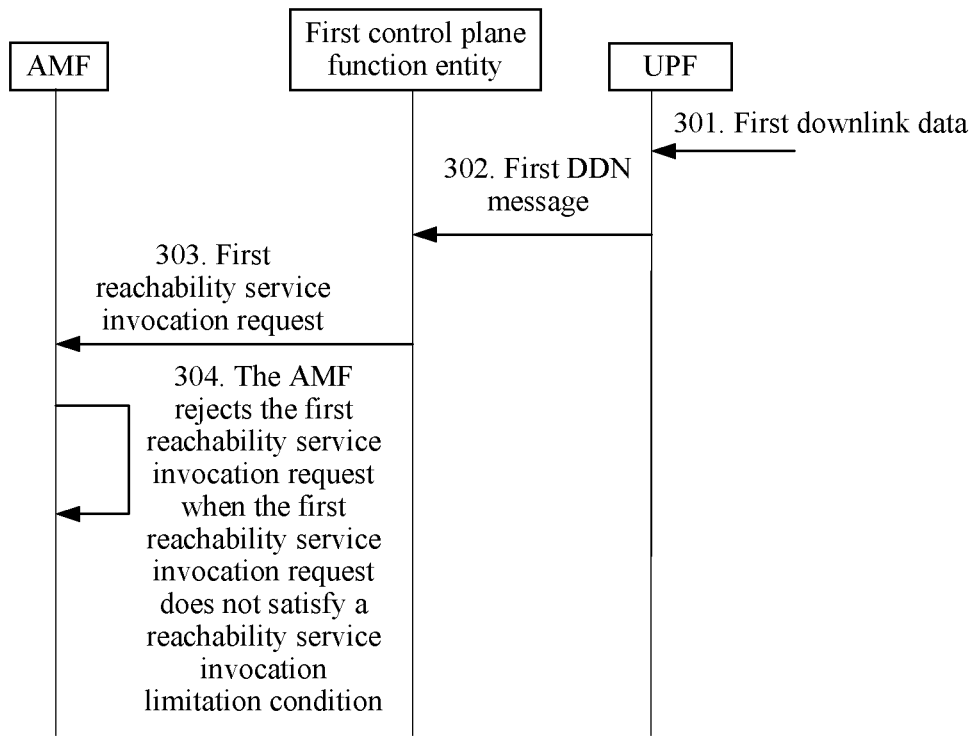
FIG. 3 is a schematic diagram of a procedure of interaction between an AMF, a first control plane function entity, and a UPF in a request processing method according to an embodiment of this application.

FIG. 3 is a schematic diagram of a process of interaction between an AMF, a first control plane function entity, and a UPF. A data notification obtained by the first control plane function entity may include a DDN or a short message service message notification. That the first control plane function entity obtains a first DDN message is used as an example for description below. The process mainly includes the following steps.

301. The UPF obtains first downlink data.

The UPF may receive, from a data network, the first downlink data that needs to be sent to a terminal device.

302. The UPF sends the first DDN message to the first control plane function entity.

A communication connection is established between the UPF and the first control plane function entity. For example, a communication connection is established between the UPF and a first SMF. The first control plane function entity may be a control plane function entity determined by the AMF for the terminal device. The UPF may generate the first DDN message based on the first downlink data obtained from the data network, and then the UPF sends the first DDN message to the first control plane function entity.

303. The first control plane function entity sends a first reachability service invocation request to the AMF.

The first control plane function entity obtains the first DDN message from the UPF, and then the first control plane function entity generates the first reachability service invocation request based on the first DDN message. The first reachability service invocation request may be used to request the AMF to instruct the terminal device to receive downlink data. If the terminal device enters an idle state, the AMF may determine, based on the first reachability service invocation request, whether to page the terminal device that enters the idle state.

304. The AMF rejects the first reachability service invocation request when the AMF determines, based on the first reachability service invocation request, that a reachability service invocation limitation condition is satisfied.

The AMF stores the reachability service invocation limitation condition. The reachability service invocation limitation condition is a condition that needs to be satisfied for reachability service invocation. The AMF accepts the first reachability service invocation request only when the AMF determines, based on the reachability service invocation request, that the reachability service invocation limitation condition is not satisfied. When the AMF determines, based on the first reachability service invocation request, that the reachability service invocation limitation condition is satisfied, the AMF rejects the reachability service invocation request. The reachability service invocation limitation condition may be implemented in a plurality of manners. For example, the reachability service invocation limitation condition used by the AMF may be determined from a plurality of aspects such as a reachability service invocation count, reachability service invocation frequency, a priority level of an allocation retention priority (ARP), a service attribute, a user configuration, and a limited time period. The reachability service invocation count is a quantity of reachability services that have been invoked for the terminal device. The reachability service invocation frequency is frequency for invoking a reachability service for the terminal device in a specified period of time. The ARP is a priority at which an access network device preempts a session resource of another device and a priority at which another device preempts a session resource of the access network device, when resources are limited. The service attribute is a service attribute of downlink data. For example, the downlink data allows only a terminal to initiate a service. The user configuration is a configuration that is of the terminal device and that corresponds to the downlink data from the data network. The limited time period is a time period within which a reachability service is limited. After the AMF obtains the first reachability service invocation request, the AMF may determine, based on the first reachability service invocation request, whether the reachability service invocation limitation condition is satisfied. When the AMF determines, based on the first reachability service invocation request, that the reachability service invocation limitation condition is satisfied, the AMF cannot provide a reachability service, and the AMF may reject the first reachability service invocation request. In this embodiment of this application, the AMF may determine, based on the first reachability service invocation request, whether the reachability service invocation limitation condition is satisfied. In this way, in this embodiment of this application, the AMF may be used to resolve a DDN quantity coordination problem related to the first SMF, to control a quantity of DDNs and signaling that is used for triggering paging, thereby avoiding overload of a network element in a core network.

In all the embodiments of this application, a network element obtains a notification or a request, and the obtaining may be implemented only by receiving the notification or the request.

Figure 4:
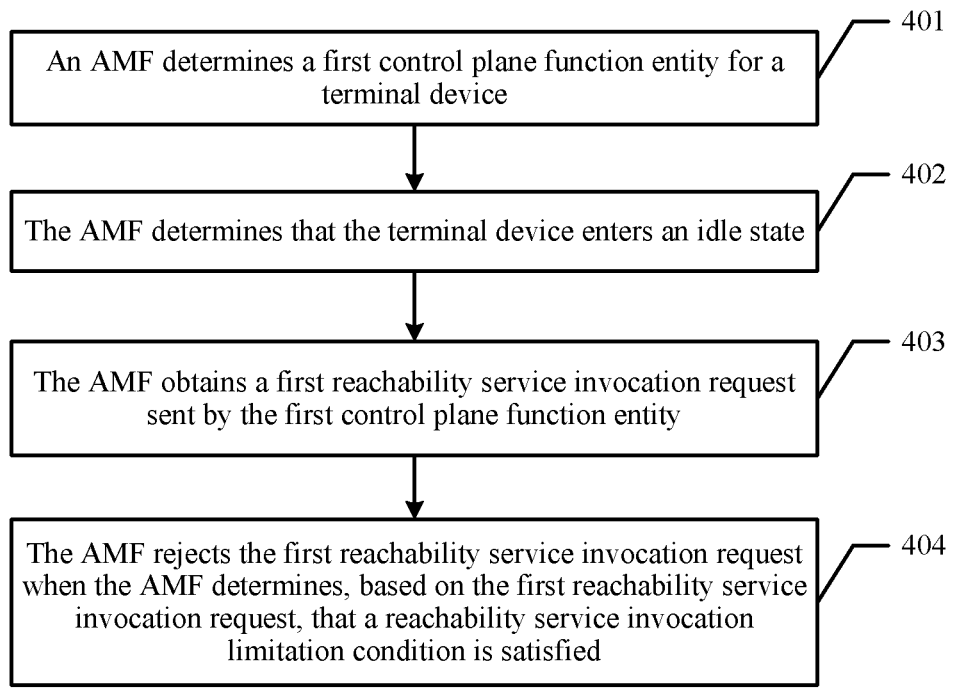
FIG. 4 is a schematic block diagram of a procedure of a request processing method according to an embodiment of this application.

A request processing method provided in an embodiment of this application is first described below. The request processing method may be performed by an AMF in a core network. Referring to FIG. 4, the request processing method provided in this embodiment of this application may include the following steps.

401. The AMF determines a first control plane function entity for a terminal device.

In this embodiment of this application, the AMF may select at least one control plane function entity for the terminal device or select at least one control plane function entity for the terminal device by using a network repertory function entity (NRF). The control plane function entity may be specifically one of an SMF, a PCF, an SMSF, and a UDM. A communication connection may be established between the control plane function entity and the AMF. For example, the control plane function entity may be directly connected to the AMF, or the control plane function entity may communicate with the AMF through forwarding performed by a network element in the core network. For example, one UE may simultaneously have a plurality of SMFs, and the plurality of SMFs may be configured to serve the UE. In this embodiment of this application, the AMF first determines the first control plane function entity for the terminal device. Unlimitedly, the AMF may further determine a second control plane function entity for the terminal device, and the AMF may further determine a third control plane function entity for the terminal device.

402. The AMF determines that the terminal device enters an idle state.

In this embodiment of this application, the AMF may obtain a status of the terminal device. For example, the AMF learns that the status of the terminal device is the idle state. When the terminal device is in the idle state, the terminal device cannot receive downlink data.

It should be noted that there is no logical sequence for step 401 and step 402. Step 401 may be performed before step 402, or step 402 may be performed before step 401, or step 401 and step 402 may be simultaneously performed.

403. The AMF obtains a first reachability service invocation request from the first control plane function entity.

In this embodiment of this application, the first control plane function entity may send the first reachability service invocation request to the AMF. That the AMF obtains the first reachability service invocation request may be specifically that the AMF receives the first reachability service invocation request from the first control plane function entity. The AMF may determine whether to page the terminal device that enters the idle state. For example, the first reachability service invocation request is generated by the first control plane function entity. The first reachability service invocation request may be used to request the AMF to page the terminal device that enters the idle state.

404. The AMF rejects the first reachability service invocation request when the AMF determines, based on the first reachability service invocation request, that a reachability service invocation limitation condition is satisfied.

In this embodiment of this application, after the AMF obtains the first reachability service invocation request, the AMF may determine, by using the reachability service invocation limitation condition stored on the AMF side, whether the first reachability service invocation request satisfies the condition. The reachability service invocation limitation condition is a condition that needs to be satisfied for reachability service invocation. The AMF accepts the reachability service invocation request only when the reachability service invocation limitation condition is not satisfied. When the reachability service invocation limitation condition is satisfied, the AMF rejects the reachability service invocation request. The reachability service invocation limitation condition may be implemented in a plurality of manners. For example, the reachability service invocation limitation condition used by the AMF may be determined from a plurality of aspects such as a reachability service invocation count, reachability service invocation frequency, a priority level of an ARP, a service attribute, a user configuration, and a limited time period. The AMF may determine, based on the first reachability service invocation request, whether the reachability service invocation limitation condition is satisfied. In this embodiment of this application, the AMF needs to be capable of determining whether the first reachability service invocation request satisfies the reachability service invocation limitation condition, so as to coordinate reachability service invocation requests from a control plane function network element, and control load of the AMF and a paging operation in a RAN. In this embodiment of this application, the AMF may be used to resolve a data notification coordination problem related to the first control plane function entity, to control a data notification and signaling that is used for triggering paging, thereby avoiding overload of a network element in the core network.

In some embodiments of this application, the reachability service invocation limitation condition is determined according to a local configuration policy of the AMF; or the reachability service invocation limitation condition is determined by using reachability service invocation limitation information received by the AMF from a policy control function entity PCF.

The AMF may determine the reachability service invocation limitation condition according to the configuration policy of the network element. Alternatively, a communication connection is established between the AMF and the PCF in the core network. The PCF may store the reachability service invocation limitation condition. The PCF may send the reachability service invocation limitation information to the AMF. The AMF receives the reachability service invocation limitation information, so that the AMF can obtain the reachability service invocation limitation condition. The AMF may determine, based on an implementation scenario, a manner of obtaining the reachability service invocation limitation condition.

In some embodiments of this application, the reachability service invocation limitation condition used by the AMF includes at least one of the following conditions: a reachability service invocation count limitation condition, a reachability service invocation frequency limitation condition, a service attribute limitation condition, a user configuration limitation condition, and a reachability service invocation-limited time period condition.

The reachability service invocation count limitation condition is a limited reachability service invocation count that is set for the terminal device. It may be determined, based on the reachability service invocation count limitation condition, whether the first reachability service invocation request satisfies the limited reachability service invocation count. The reachability service invocation frequency limitation condition is limited reachability service invocation frequency that is set for the terminal device. It may be determined, based on the reachability service invocation frequency limitation condition, whether the first reachability service invocation request satisfies the limited reachability service invocation frequency. The service attribute limitation condition is a limitation, set for the terminal device, of reachability service invocation on a service attribute of downlink data. It may be determined, based on the service attribute limitation condition, whether downlink data corresponding to the first reachability service invocation request satisfies a service attribute limitation of reachability service invocation. For example, if the service attribute limitation condition is that only a service initiated by the terminal device is allowed, if the first reachability service invocation request is downlink data from a network side, the first reachability service invocation request satisfies the service attribute limitation condition. The user configuration limitation condition is a limitation, set for the terminal device, of reachability service invocation on a user configuration. It may be determined, based on the user configuration limitation condition, whether a user configuration corresponding to the first reachability service invocation request satisfies a limitation of reachability service invocation on the user configuration. For example, the user configuration may be set by a user about whether a call is allowed in a period of time. The reachability service invocation-limited time period condition is a time period that is set for the terminal device and in which reachability service invocation is limited. It may be determined, based on the reachability service invocation-limited time period condition, whether a request time of the first reachability service invocation request falls within the limited time period. If the request time of the first reachability service invocation request falls within the limited time period, the first reachability service invocation request satisfies the reachability service invocation-limited time period condition, and the AMF may reject the first reachability service invocation request.

It should be noted that in the foregoing embodiments of this application, the reachability service invocation limitation condition used by the AMF may include one or more of the foregoing limitation conditions, and a specific implementation depends on an application scenario of the AMF. This is not limited herein. When the reachability service invocation limitation condition includes a plurality of limitation conditions, if the first reachability service invocation request satisfies any limitation condition, it indicates that reachability service invocation is limited, and the AMF may reject the first reachability service invocation request.

In some embodiments of this application, the reachability service invocation limitation condition further includes a priority level limitation condition for an ARP.

The AMF may also set a priority level limitation on the ARP. If an ARP carried in the first reachability service invocation request satisfies the priority level limitation condition for the ARP, the AMF may reject the first reachability service invocation request.

Further, in some embodiments of this application, the first reachability service invocation request includes a first ARP. In this case, step 404 in which the AMF rejects the first reachability service invocation request when the AMF determines, based on the first reachability service invocation request, that the reachability service invocation limitation condition is satisfied includes the following:

The AMF obtains a second reachability service invocation request from a second control plane function entity, where the second reachability service invocation request includes a second ARP, and the second control plane function entity is another control plane function entity that is different from the first control plane function entity and that is determined by the AMF for the terminal device; and the AMF rejects the first reachability service invocation request when a priority level of the second ARP is higher than a priority level of the first ARP.

The AMF separately obtains two reachability service invocation requests, and the two reachability service invocation requests respectively carry the first ARP and the second ARP. In this case, the AMF may compare priority levels of the ARPs. The AMF accepts only a reachability service invocation request corresponding to an ARP with a higher priority level, and the AMF rejects a reachability service invocation request corresponding to an ARP with a lower priority level. In this way, the AMF can control reachability service invocation based on the priority level limitation condition for the ARP.

In some other embodiments of this application, the first reachability service invocation request includes a first ARP. The priority level limitation condition for the ARP includes: not higher than a highest priority level of an ARP of a reachability service invocation request processed by the AMF. Each time the AMF processes a reachability service invocation request, the AMF may record an ARP corresponding to the request. The AMF continuously updates a processed ARP with a highest priority level. In this implementation scenario, step 403 in which the AMF rejects the first reachability service invocation request when the AMF determines, based on the first reachability service invocation request, that the reachability service invocation limitation condition is satisfied includes the following:

The AMF rejects the first reachability service invocation request when a priority level of the first ARP is lower than or equal to the highest priority level of the ARP of the processed reachability service invocation request.

The AMF accepts only a reachability service invocation request corresponding to an ARP with a priority level higher than the highest priority level. The AMF rejects a reachability service invocation request corresponding to an ARP with a priority level not higher than the highest priority level. In this way, the AMF can control reachability service invocation based on the priority level limitation condition for the ARP.

In some embodiments of this application, that the AMF rejects the first reachability service invocation request includes the following:

The AMF sends a reachability service invocation reject message to the first control plane function entity.

To be specific, the AMF may reject the first reachability service invocation request by returning a reject message, so that the first control plane function entity can determine, based on the received reachability service invocation reject message, that the AMF rejects the current request. Unlimitedly, the AMF may reject the first reachability service invocation request in a plurality of manners. For example, the AMF does not respond to the first reachability service invocation request, and consequently the first control plane function entity cannot receive a response from the AMF. In this case, the first control plane function entity may also determine that the AMF rejects the current request. For example, the AMF does not respond to the first reachability service invocation request within five seconds, and if the first control plane function entity receives no response from the AMF within five seconds, the first control plane function entity may also determine that the AMF rejects the current request.

Further, in some embodiments of this application, the reachability service invocation reject message includes at least one of the following information: information indicating that a limited reachability service invocation count is equal to 0, information about a first time period, limit over indication information, and information about the highest priority level of the ARP of the reachability service invocation request processed by the AMF. The information about the first time period is used to indicate that the first control plane function entity shall not send a reachability service invocation request within the first time period.

The reachability service invocation limitation condition may be specifically a reachability service invocation count limitation condition. If a limited reachability service invocation count indicated by the reachability service invocation count limitation condition is equal to 0, the AMF may determine, by using the reachability service invocation reject message, that a value of the limited reachability service invocation count is 0. In addition, the AMF may alternatively add a first time period to a field of the reachability service invocation reject message. The first control plane function entity receives the reachability service invocation reject message, and parses out a value of the first time period, and according to an indication of the AMF, the first control plane function entity shall not send a reachability service invocation request within the first time period. In addition, the AMF may add a limit over indication to the reachability service invocation reject message. The first control plane function entity receives the reachability service invocation reject message, and parses out the limit over indication.

In some embodiments of this application, in addition to the foregoing steps, the request processing method provided in this embodiment of this application may include the following step:

The AMF sends a notification message to a third control plane function entity. The notification message includes at least one of the following information: information indicating that a limited reachability service invocation count is equal to 0, information about a first time period, limit over indication information, and information about the highest priority level of the ARP of the reachability service invocation request processed by the AMF. The information about the first time period is used to indicate that the first control plane function entity shall not send a reachability service invocation request within the first time period. The third control plane function entity is another control plane function entity that is different from the first control plane function entity and that is determined by the AMF for the terminal device.

The third control plane function entity is a control plane function entity that does not send a reachability service invocation request to the AMF. The third control plane function entity may also receive the notification message from the AMF. The third control plane function entity may determine, by parsing the notification message, the reachability service invocation reject message from the AMF. It can be learned from the foregoing examples that the third control plane function entity may obtain at least one of the following information: the information indicating that the limited reachability service invocation count is equal to 0, the information about the first time period, or the limit over indication information. The third control plane function entity may determine, by using the reachability service invocation reject message, a manner in which the AMF controls a reachability service invocation request. For example, the third control plane function entity may determine whether a DDN can still be generated or whether a short message service message notification can be generated. Therefore, the AMF can control, by using the notification message, a data notification and signaling that is used for triggering paging, thereby avoiding overload of a network element in a core network.

It should be noted that in the foregoing embodiment, an execution manner used by the AMF when the AMF determines that the reachability service invocation limitation condition is satisfied is described in step 403. Another step included in the request processing method provided in this embodiment of this application is described below.

The AMF accepts the first reachability service invocation request when the AMF determines, based on the first reachability service invocation request, that the reachability service invocation limitation condition is not satisfied.

The AMF may determine whether the reachability service invocation limitation condition is satisfied. The reachability service invocation limitation condition is a condition that needs to be satisfied for reachability service invocation. The AMF accepts the reachability service invocation request only when the reachability service invocation limitation condition is not satisfied. After accepting the first reachability service invocation request, the AMF may page the terminal device. After the terminal device is successfully paged, a UPF may send downlink data to the terminal device.

Further, in some embodiments of this application, that the AMF accepts the first reachability service invocation request includes the following:

The AMF sends a reachability service invocation accept message to the first control plane function entity.

The AMF may accept the first reachability service invocation request by returning an accept message. Different message identifiers may be used for the reachability service invocation accept message and the reachability service invocation reject message, so that the first control plane function entity can learn, by determining a message identifier, that the AMF sends the reachability service invocation accept message, and the first control plane function entity determines, based on the reachability service invocation accept message, that the AMF accepts the current request.

Further, in some embodiments of this application, the reachability service invocation accept message includes information about a remaining reachability service invocation count, and/or information about a highest priority level of an ARP of a reachability service invocation request processed by the AMF.

The information about the remaining reachability service invocation count is obtained through calculation by the AMF based on a limited reachability service invocation count and the first reachability service invocation request.

For example, each time the AMF processes a reachability service invocation request, the AMF may update the limited reachability service invocation count. If the AMF accepts the first reachability service invocation request, the AMF may decrease the limited reachability service invocation count by 1, and a result is recorded as the remaining reachability service invocation count. The AMF may add, to the reachability service invocation accept message, the information about the remaining reachability service invocation count, and/or the information about the highest priority level of the ARP of the reachability service invocation request processed by the AMF, so that the first control plane function entity may determine, based on the information about the remaining reachability service invocation count, and/or the information about the highest priority level of the ARP of the reachability service invocation request processed by the AMF, whether a DDN can continue to be used. If a reachability service invocation request generated by the first control plane function entity does not satisfy the information about the remaining reachability service invocation count, and/or the information about the highest priority level of the ARP of the reachability service invocation request processed by the AMF, the first control plane function entity may send the request to the AMF.

In some embodiments of this application, in addition to the foregoing steps, the request processing method provided in this embodiment of this application may include the following steps:

The AMF obtains a status update message of the terminal device, where the status update message includes: the terminal device enters a connected state, or the terminal device is unsuccessfully paged; and the AMF sends the status update message to the first control plane function entity.

The AMF may further monitor a status of the terminal device in real time. If the terminal device enters the connected state, or the terminal device is unsuccessfully paged, the AMF may send the status update message to the first control plane function entity, so that the first control plane function entity may obtain a latest status of the terminal device.

Further, in some embodiments of this application, the request processing method provided in this embodiment of this application may further include the following step:

The AMF sends the status update message to a third control plane function entity. The third control plane function entity is another control plane function entity that is different from the first control plane function entity and that is determined by the AMF for the terminal device, and the third control plane function entity does not send a reachability service invocation request to the AMF.

The third control plane function entity is a control plane function entity that does not send a reachability service invocation request to the AMF. The third control plane function entity may also receive the status update message from the AMF. The third control plane function entity may determine the latest status of the terminal device by parsing the status update message.

It can be learned from the example descriptions of this application in the foregoing embodiment that, after obtaining the first reachability service invocation request, the AMF may determine, based on the first reachability service invocation request, whether the reachability service invocation limitation condition is satisfied. When the AMF determines, based on the first reachability service invocation request, that the reachability service invocation limitation condition is satisfied, the AMF cannot provide a reachability service, and the AMF may reject the first reachability service invocation request. In this embodiment of this application, by using the reachability service invocation limitation condition used by the AMF, the AMF may determine, based on the first reachability service invocation request, whether the reachability service invocation limitation condition is satisfied. In this way, in this embodiment of this application, the AMF may be used to resolve a data notification coordination problem related to the first control plane function entity, to control a data notification and signaling that is used for triggering paging, thereby avoiding overload of a network element in a core network.

Figure 5:
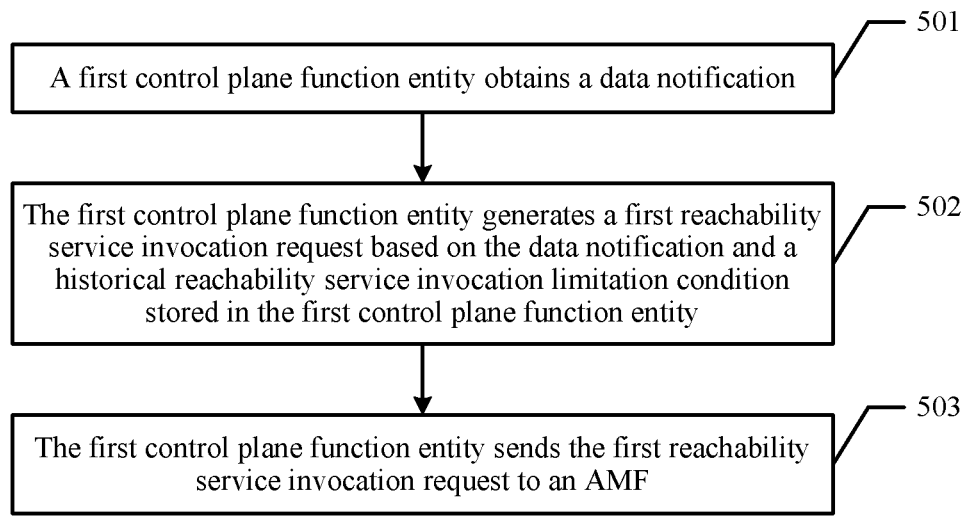
FIG. 5 is a schematic block diagram of a procedure of another request processing method according to an embodiment of this application.

The request processing method performed by the AMF is described in the foregoing embodiment. A request processing method provided in an embodiment of this application is described below from a side of a first control plane function entity. Referring to FIG. 5, the request processing method provided in this embodiment of this application mainly includes the following steps.

501. The first control plane function entity obtains a data notification.

The data notification may be specifically a first DDN message, or may be a short message service message notification. The first control plane function entity may obtain the first DDN message from a UPF, and the first DDN message is generated by the UPF based on first downlink data from a data network; or the first control plane function entity obtains the short message service message notification from a short message service message data center.

In this embodiment of this application, a communication connection is established between the UPF and the first control plane function entity. For example, a communication connection is established between the UPF and a first SMF. The first control plane function entity may be a control plane function entity determined by an AMF for a terminal device. The UPF may receive, from the data network, the first downlink data that needs to be sent to the terminal device. The UPF may generate the first DDN message based on the first downlink data obtained from the data network, and then the UPF sends the first DDN to the first control plane function entity. The first control plane function entity obtains the first DDN message from the UPF. The first control plane function entity parses the first DDN message, and may obtain an ARP carried in the first DDN message.

502. The first control plane function entity generates a first reachability service invocation request based on the data notification and a historical reachability service invocation limitation condition stored in the first control plane function entity.

In this embodiment of this application, for example, the first control plane function entity obtains the first DDN message from the UPF, and then the first control plane function entity generates the first reachability service invocation request based on the first DDN message and the historical reachability service invocation limitation condition. The first reachability service invocation request may be used to request the AMF to instruct the terminal device to receive downlink data. If the terminal device enters an idle state, the AMF may determine, based on the first reachability service invocation request, whether to page the terminal device that enters the idle state. The historical reachability service invocation limitation condition is stored in the first control plane function entity. The historical reachability service invocation limitation condition is a historical limitation condition that needs to be satisfied for reachability service invocation. The historical limitation condition may be a reachability service invocation limitation condition used by the first control plane function entity to generate a previous reachability service invocation request. The first control plane function entity generates a reachability service invocation request only when a DDN message does not satisfy the historical reachability service invocation limitation condition; or the first control plane function entity cannot generate a reachability service invocation request for a DDN message when the DDN message satisfies the historical reachability service invocation limitation condition.

In some embodiments of this application, an example in which the data notification is specifically a first DDN message is used for description. After the first control plane function entity obtains the data notification in step 501, in addition to the foregoing steps, the request processing method provided in this embodiment of this application may include the following steps:

The first control plane function entity determines, based on the historical reachability service invocation limitation condition, whether generation of a DDN message is allowed; and if generation of a DDN message is not allowed, the first control plane function entity sends the notification message to the UPF, where the notification message includes: the first control plane function entity does not allow generation of a DDN message; or if generation of a DDN message is allowed, the first control plane function entity triggers performing of step 502, that is, the first control plane function entity generates the first reachability service invocation request based on the data notification and the historical reachability service invocation limitation condition stored in the first control plane function entity.

The first control plane function entity stores the historical reachability service invocation limitation condition. The first control plane function entity may determine, by using the historical reachability service invocation limitation condition, whether generation of a DDN message is allowed. The DDN message is an additionally generated DDN. To be specific, the first control plane function entity may control whether to generate an additional DDN message. If generation of a DDN message is not allowed, the first control plane function entity may not allow the UPF to generate a DDN message. For example, if the historical reachability service invocation limitation condition is that a limited reachability service invocation count is 0, the first control plane function entity may not allow the UPF to generate a DDN message. If the first control plane function entity determines, based on the historical reachability service invocation limitation condition, to allow generation of a DDN message, step 502 and a subsequent step 503 are then performed.

503. The first control plane function entity sends the first reachability service invocation request to the AMF.

After generating the first reachability service invocation request in the foregoing step, the first control plane function entity may send the first reachability service invocation request to the AMF by using a communication connection between the first control plane function entity and the AMF. The AMF may process the first reachability service invocation request according to the request processing method described in the foregoing embodiment.

In some embodiments of this application, the first control plane function entity learns, by parsing the first DDN message, that an ARP of the terminal device that is carried in the first DDN message is a first ARP. The first reachability service invocation request generated by the first control plane function entity further includes the first ARP, so that the AMF can obtain the first ARP by using the first reachability service invocation request. The AMF may determine, based on the first ARP, whether to reject the first reachability service invocation request.

In some embodiments of this application, after the first control plane function entity sends the first reachability service invocation request to the access and mobility management function entity AMF in step 503, in addition to the foregoing steps, the request processing method provided in this embodiment of this application may include the following steps:

The first control plane function entity receives a reachability service invocation reject message or a reachability service invocation accept message from the AMF; and the first control plane function entity updates the historical reachability service invocation limitation condition based on the reachability service invocation reject message or the reachability service invocation accept message.

The first control plane function entity receives the reachability service invocation reject message or the reachability service invocation accept message from the AMF, and then the first control plane function entity may update the historical reachability service invocation limitation condition based on the message received from the AMF. An updated historical reachability service invocation limitation condition may be used to determine the first DDN message from the UPF, to control whether to generate the first reachability service invocation request, thereby avoiding overload of a network element in a core network.

Further, in some embodiments of this application, the reachability service invocation reject message includes at least one of the following information: information indicating that a limited reachability service invocation count is equal to 0, information about a first time period, limit over indication information, and information about a highest priority level of an ARP of a reachability service invocation request processed by the AMF. The information about the first time period is used to indicate that the first control plane function entity shall not send a reachability service invocation request within the first time period.

The reachability service invocation accept message includes information about a remaining reachability service invocation count, and/or information about a highest priority level of an ARP of a reachability service invocation request processed by the AMF.

For example descriptions of the reachability service invocation reject message and the reachability service invocation accept message, refer to the descriptions in the embodiment of the request processing method performed on the AMF side in the foregoing embodiment. Details are not described herein again.

In some embodiments of this application, in addition to the foregoing steps, the request processing method provided in this embodiment of this application may include the following step:

The first control plane function entity receives a status update message from the AMF. The status update message includes: the terminal device enters a connected state, or the terminal device is unsuccessfully paged.

The AMF may further monitor a status of the terminal device in real time. If the terminal device enters the connected state, or the terminal device is unsuccessfully paged, the AMF may send the status update message to the first control plane function entity, so that the first control plane function entity may obtain a latest status of the terminal device.

It can be learned from the example descriptions of this application in the foregoing embodiment that, the first control plane function entity may send the first reachability service invocation request to the AMF. Therefore, the AMF may determine, based on the first reachability service invocation request, whether the reachability service invocation limitation condition is satisfied. When the AMF determines, based on the first reachability service invocation request, that the reachability service invocation limitation condition is satisfied, the AMF cannot provide a reachability service, and the AMF may reject the first reachability service invocation request. In this embodiment of this application, by using the reachability service invocation limitation condition used by the AMF, the AMF may determine, based on the first reachability service invocation request, whether the reachability service invocation limitation condition is satisfied. In this way, in this embodiment of this application, the AMF may be used to resolve a data notification coordination problem related to the first control plane function entity, to control a data notification and signaling that is used for triggering paging, thereby avoiding overload of a network element in a core network.

Figure 6:
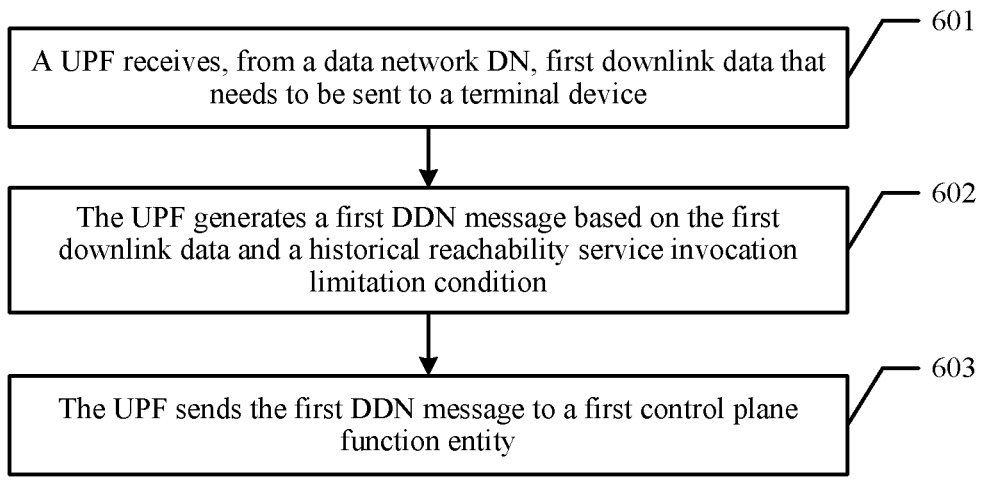
FIG. 6 is a schematic block diagram of a procedure of a downlink data notification processing method according to an embodiment of this application.
Figure 7A:
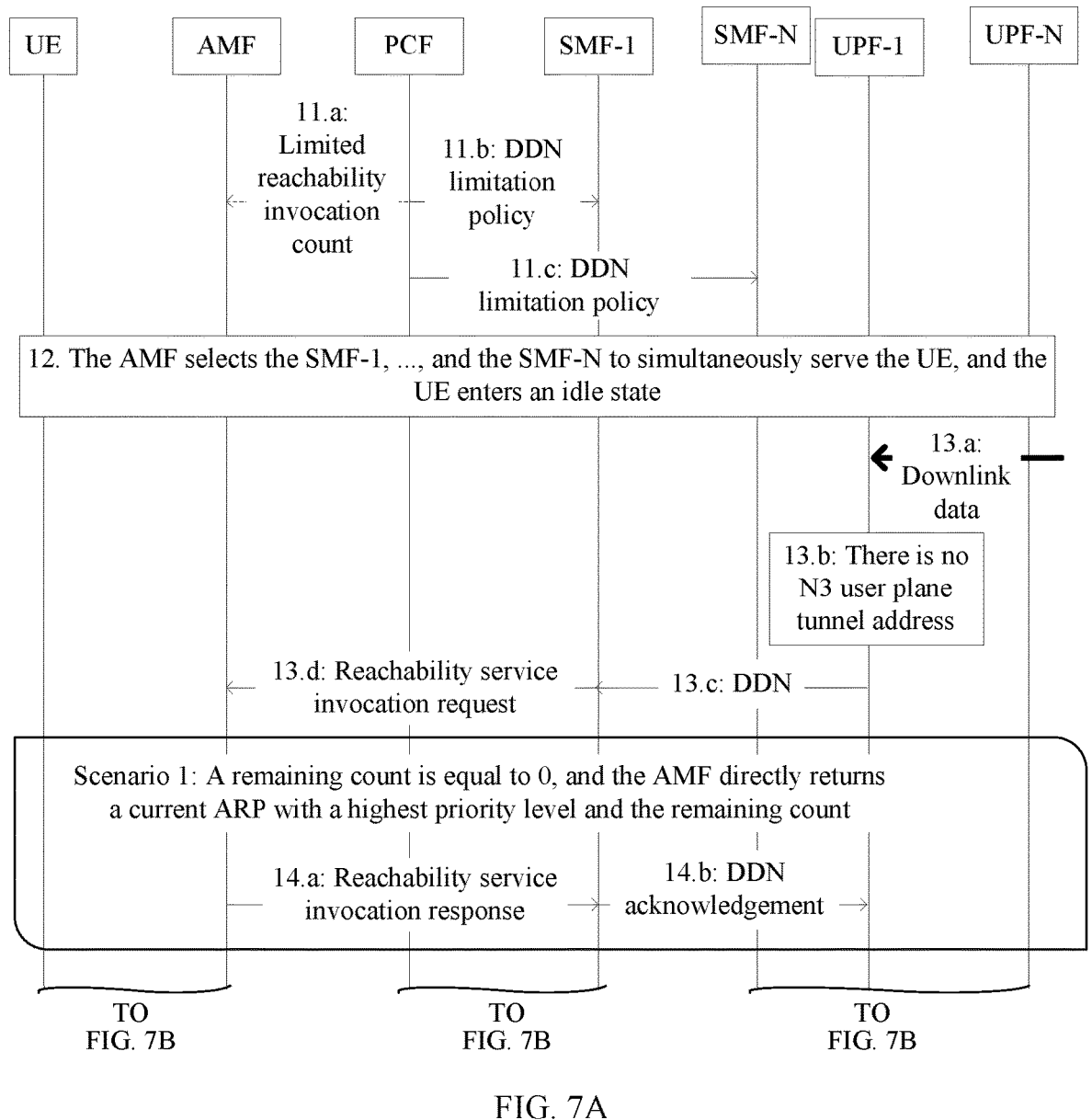
FIG. 7A to FIG. 7D are a schematic diagram of an implementation scenario to which a request processing method is applied according to an embodiment of this application.
Figure 7B:
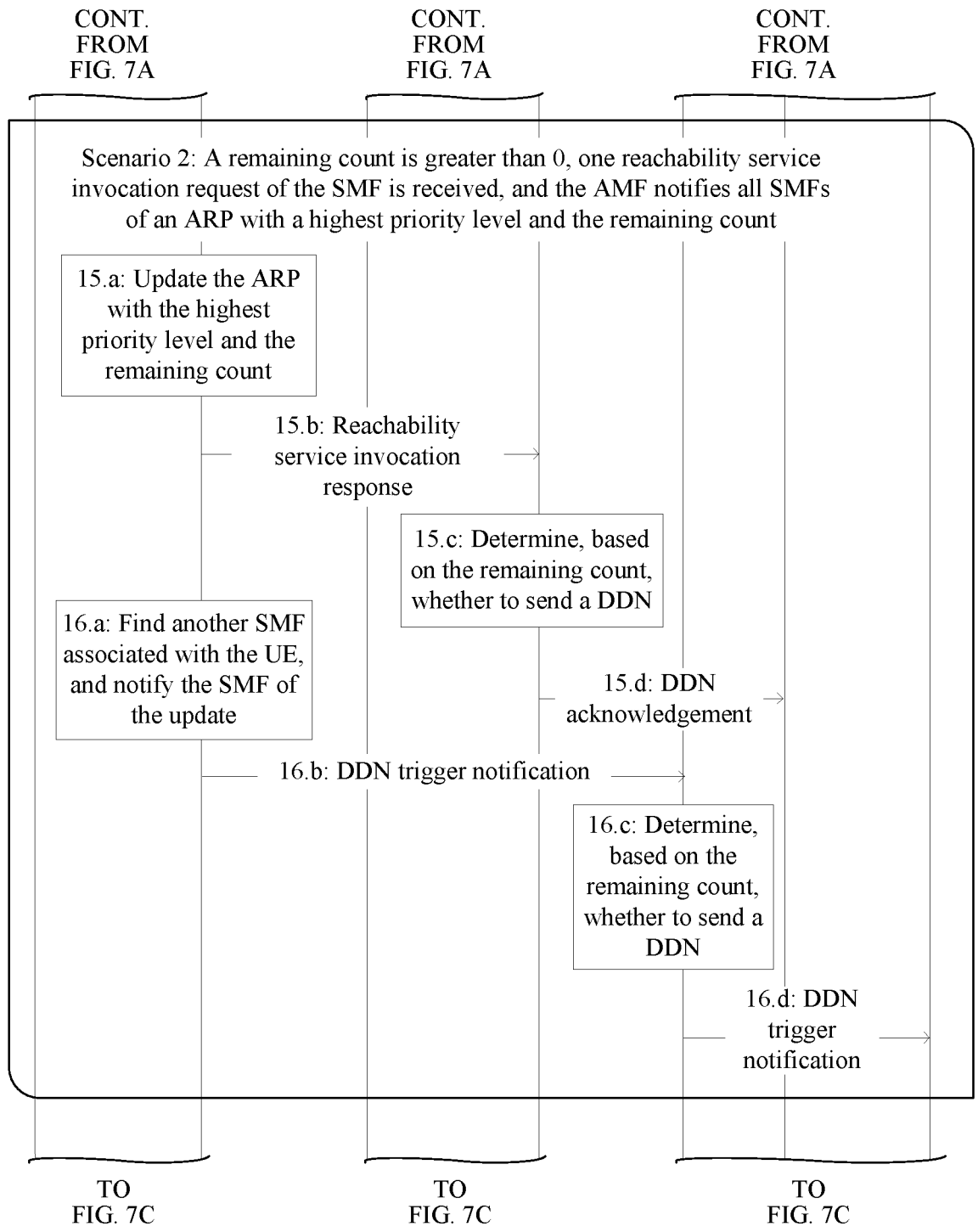
Figure 7C:
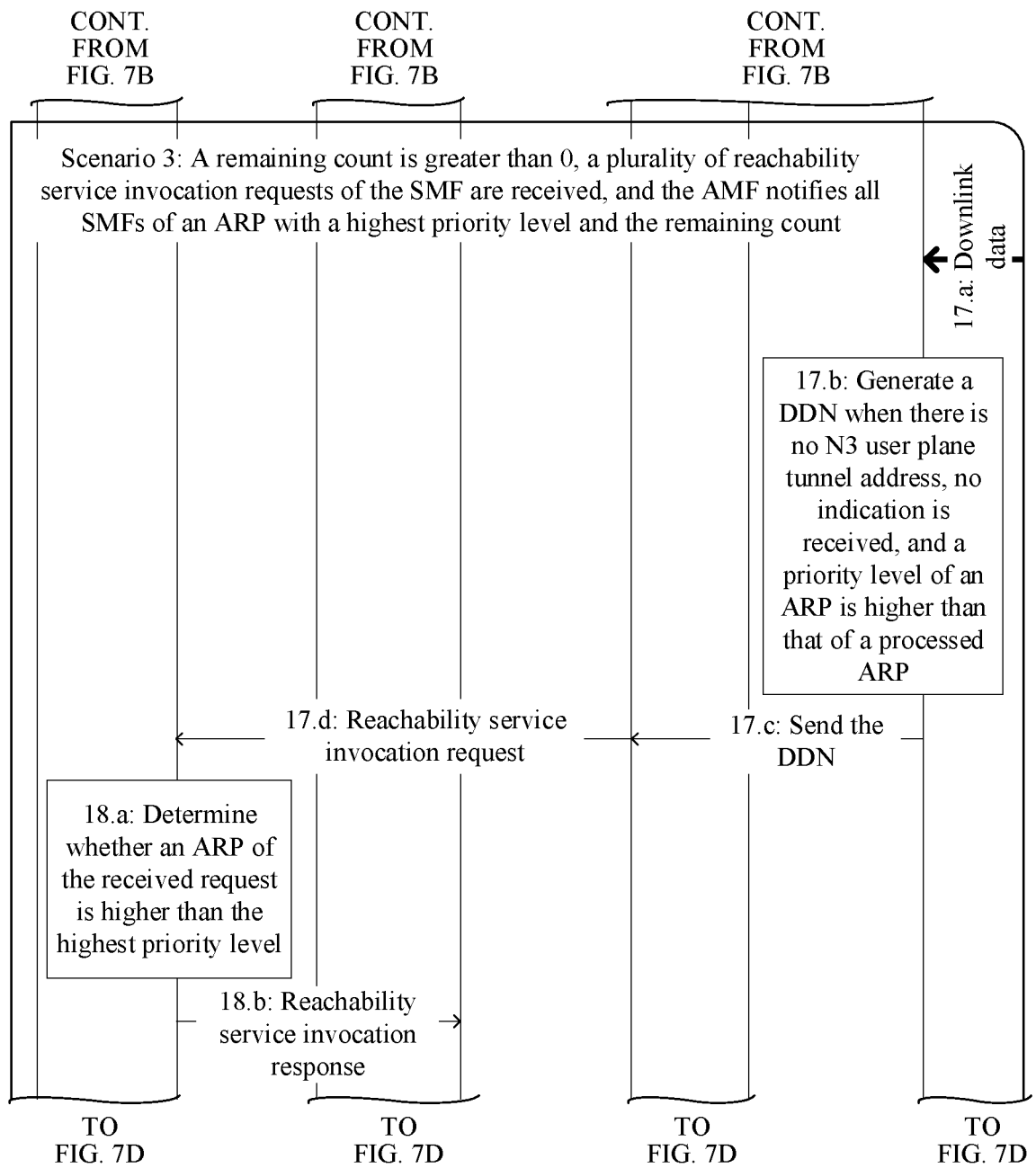
Figure 7D:
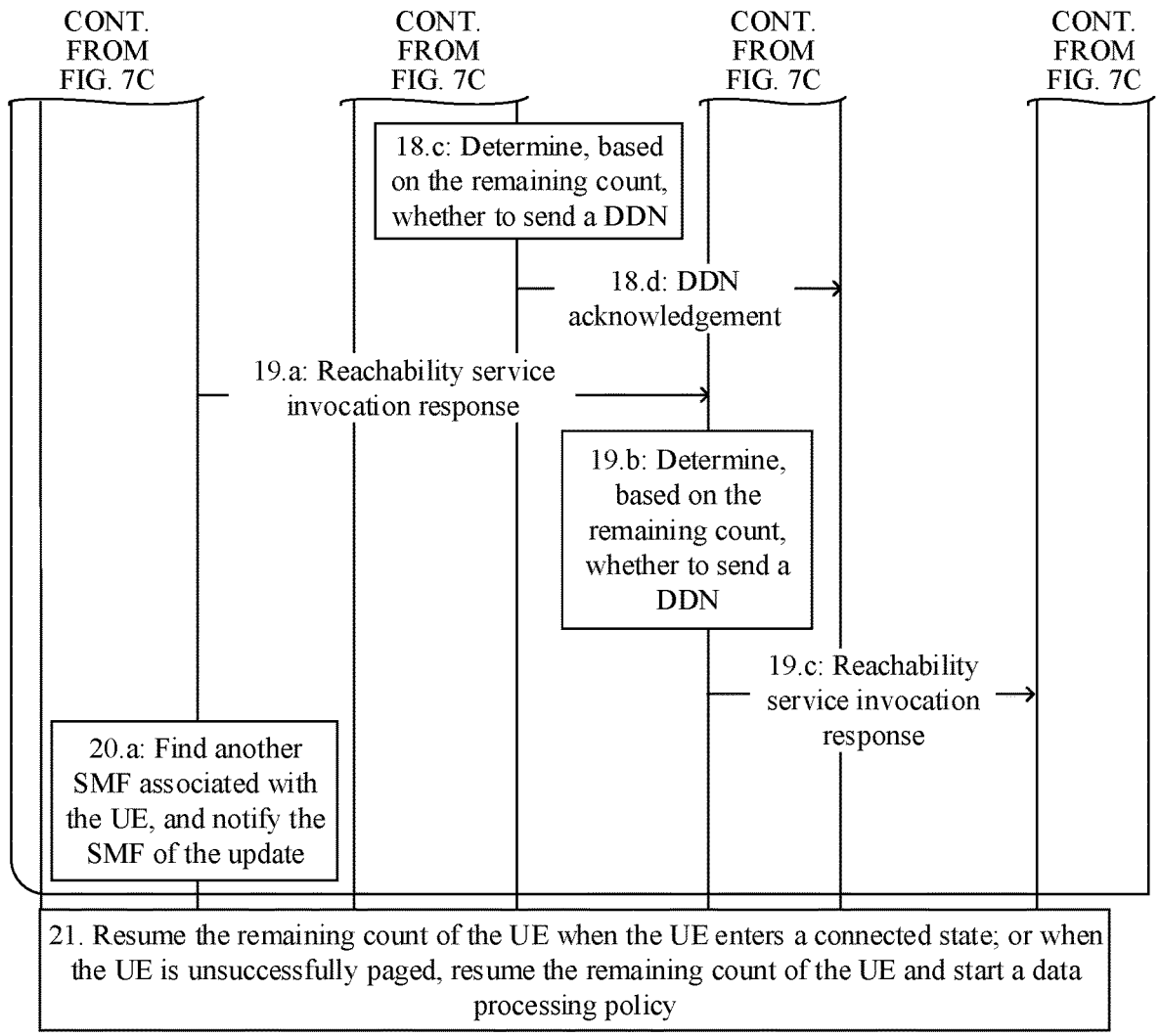

The request processing method performed by the AMF and the request processing method performed by the first control plane function entity are described in the foregoing embodiments. Referring to FIG. 6, a downlink data notification processing method provided in an embodiment of this application mainly includes the following steps.

601. A UPF receives, from a data network, first downlink data that needs to be sent to a terminal device.

In this embodiment of this application, a communication connection is established between the UPF and the data network. The UPF may receive, from the data network, the first downlink data that needs to be sent to the terminal device. The UPF may determine an ARP based on the first downlink data.

602. The UPF generates a first DDN message based on the first downlink data and a historical reachability service invocation limitation condition.

In this embodiment of this application, the UPF may receive, from the data network, the first downlink data that needs to be sent to the terminal device. The UPF generates the first DDN message based on the first downlink data and the historical reachability service invocation limitation condition. The historical reachability service invocation limitation condition is stored in the UPF. The historical reachability service invocation limitation condition is a historical limitation condition that needs to be satisfied for reachability service invocation. The historical limitation condition may be a reachability service invocation limitation condition used by the UPF to generate a previous DDN message. The UPF generates a DDN message only when downlink data does not satisfy the historical reachability service invocation limitation condition; or the UPF cannot generate a DDN message for downlink data when the downlink data satisfies the historical reachability service invocation limitation condition.

603. The UPF sends the first DDN message to a first control plane function entity.

In this embodiment of this application, a communication connection is established between the UPF and the first control plane function entity. For example, a communication connection is established between the UPF and a first SMF. The first control plane function entity may be a control plane function entity determined by an AMF for the terminal device.

In some embodiments of this application, the first DDN message further includes an allocation retention priority ARP corresponding to the terminal device.

The first DDN message that may be generated by the UPF further carries a first ARP. Therefore, a first reachability service invocation request generated by the first control plane function entity may include the first ARP, so that the AMF can obtain the first ARP of the terminal device by using the first reachability service invocation request. The AMF may determine, based on the first ARP, whether to reject the first reachability service invocation request.

In some embodiments of this application, after the UPF sends the first DDN message to the first control plane function entity in step 603, in addition to the foregoing steps, the request processing method provided in this embodiment of this application may include the following step:

The UPF receives a notification message from the first control plane function entity. The notification message includes: the first control plane function entity does not allow generation of a DDN message.

The first control plane function entity stores the historical reachability service invocation limitation condition. The first control plane function entity may determine, by using the historical reachability service invocation limitation condition, whether generation of a DDN message is allowed. The DDN message is an additionally generated DDN. To be specific, the first control plane function entity may control whether to generate an additional DDN message. If generation of a DDN message is not allowed, the first control plane function entity may not allow the UPF to generate a DDN message. The UPF determines, based on the received notification message, that no DDN message can be generated any longer.

In some embodiments of this application, after the UPF sends the first DDN message to the first control plane function entity in step 603, in addition to the foregoing steps, the request processing method provided in this embodiment of this application may include the following steps:

The UPF receives a reachability service invocation reject message or a reachability service invocation accept message from the first control plane function entity; and the UPF updates the historical reachability service invocation limitation condition based on the reachability service invocation reject message or the reachability service invocation accept message.

The UPF receives the reachability service invocation reject message or the reachability service invocation accept message from the first control plane function entity, and then the UPF may update the historical reachability service invocation limitation condition based on the message received from the first control plane function entity. An updated historical reachability service invocation limitation condition may be used to determine whether to generate a DDN message, to control whether to generate a DDN message, thereby avoiding overload of a network element in a core network.

Further, in some embodiments of this application, the reachability service invocation reject message includes at least one of the following information: information indicating that a limited reachability service invocation count is equal to 0, information about a first time period, limit over indication information, and information about a highest priority level of an ARP of a reachability service invocation request processed by the AMF. The information about the first time period is used to indicate that the first control plane function entity shall not send a reachability service invocation request within the first time period.

The reachability service invocation accept message includes information about a remaining reachability service invocation count, and/or information about a highest priority level of an ARP of a reachability service invocation request processed by the AMF.

For example descriptions of the reachability service invocation reject message and the reachability service invocation accept message, refer to the descriptions in the embodiment of the request processing method performed on the AMF side in the foregoing embodiment. Details are not described herein again.

In some embodiments of this application, in addition to the foregoing steps, the request processing method provided in this embodiment of this application may include the following steps:

The UPF receives, from the DN, second downlink data that needs to be sent to the terminal device; and the UPF rejects the second downlink data based on the reachability service invocation reject message.

If the UPF receives the reachability service invocation reject message from the first control plane function entity, when the UPF further receives the second downlink data from the data network, the UPF can no longer generate a DDN message, and the UPF rejects the second downlink data, thereby avoiding overload of a network element in a core network.

It can be learned from the example descriptions of this application in the foregoing embodiment that, the UPF sends the first DDN message to the first control plane function entity, so that the first control plane function entity can generate the first reachability service invocation request, and send the first reachability service invocation request to the AMF. Therefore, the AMF may determine, based on the first reachability service invocation request, whether the reachability service invocation limitation condition is satisfied. When the AMF determines, based on the first reachability service invocation request, that the reachability service invocation limitation condition is satisfied, the AMF cannot provide a reachability service, and the AMF may reject the first reachability service invocation request. In this embodiment of this application, by using the reachability service invocation limitation condition used by the AMF, the AMF may determine, based on the first reachability service invocation request, whether the reachability service invocation limitation condition is satisfied. In this way, in this embodiment of this application, the AMF may be used to resolve a data notification coordination problem related to the first control plane function entity, to control a data notification and signaling that is used for triggering paging, thereby avoiding overload of a network element in a core network.

To help better understand and implement the foregoing solutions of the embodiments of this application, a corresponding application scenario is used as an example below for specific description.

A system architecture provided in an embodiment of this application includes network elements such as an AMF, a first control plane function entity, a second control plane function entity, and a UPF, to resolve a DDN quantity coordination problem related to a plurality of control plane function entities. That the first control plane function entity and the second control plane function entity are specifically a first SMF and a second SMF is used as an example below for description. In this embodiment of this application, the AMF needs to coordinate, based on parameters such as a limitation on a quantity of DDNs and an ARP with a highest priority level, DDN generation mechanisms for a plurality of SMFs serving UE, to control a quantity of DDNs of the UE not to exceed a limit and control a quantity of paging instructions not to exceed a limit.

In this embodiment of this application, that the AMF coordinates quantities of DDNs for a plurality of SMFs serving UE is used as an example below for description, such as the network-triggered service request procedure shown in FIG. 2 in the foregoing embodiment. In such an implementation scenario, the AMF needs to coordinate, based on parameters such as a quantity of DDNs and an ARP with a highest priority level, DDN generation mechanisms for the plurality of SMFs serving the UE, to control a quantity of DDNs of the UE not to exceed a limit. In an implementation scenario, main steps are as follows:

1. The AMF configures or receives, from a PCF, reachability service invocation limitation information related to the UE, and the information is related to a capability of the AMF.
2. The SMF configures or receives, from the PCF, a DDN overload policy related to the UE.
3. The UPF generates a DDN for downlink data and sends the DDN to the SMF, and the SMF generates a reachability service invocation request for the UE and sends the reachability service invocation request (which is subsequently referred to as an invocation request for short) to the AMF.

4. The AMF determines, based on the reachability service invocation request, whether a reachability service invocation limitation condition is satisfied, and feeds back a remaining reachability service invocation count (which is referred to as a remaining count for short in a subsequent embodiment, or may be indicated by using a count) to the SMF, and the SMF further instructs the UPF to no longer send the DDN.

That the reachability service invocation limitation condition is a limited reachability service invocation count (which is subsequently referred to as a limited count for short) is used as an example for description below. If the AMF receives only one invocation request of the SMF, and the limited count is not 0, the AMF decreases the remaining count by 1, and returns an ARP with a highest priority level. If the limited count is 0 before an invocation request of the SMF is received, and there is an ARP with a highest priority level in this case, when subsequently receiving an invocation request of the SMF, the AMF directly returns, to the SMF, a previous ARP with a highest priority level and a previous remaining count that exist when the limited count is 0, and notifies another SMF of the previous ARP with the highest priority level and the previous remaining count. If the limited count is 0, the AMF directly returns the previous ARP with the highest priority level and the previous remaining count to the SMF.

If the AMF receives a plurality of invocation requests of the SMF, an invocation request for an ARP with a highest priority level is calculated from the plurality of SMFs. The AMF responds only to the invocation request for the ARP with the highest priority level. The AMF decreases the remaining count by 1, rejects all the other requests, returns the ARP with the highest priority level and the remaining count to the SMF, and notifies another SMF of the ARP with the highest priority level and the remaining count. One UE has one AMF and a plurality of SMFs serving the UE. After some SMFs send invocation requests, the AMF also needs to notify another SMF of the ARP with the highest priority level and the remaining count.

5. If no DDN can continue to be generated, the SMF activates a corresponding policy, and the policy includes activating an extended buffer mechanism, discarding a packet, or the like. The extended buffer mechanism is used to determine whether data is buffered in the UPF or the SMF during data buffering, a size and duration of a buffer, and the like. Additional DDN generation limitations such as a priority level and the remaining count are deleted after the UE enters a connected state.

In step 4, the AMF notifies all related SMFs of a limit over (No More Invocation) indication only when the remaining count is 0. The AMF notifies the SMFs that a quantity of reachability invocation requests exceeds a limit, and according to this indication, the SMFs no longer continue to send invocation requests.

Network elements used in this embodiment of this application are the SMF, the PCF, the UPF, and the AMF. In this embodiment, the AMF receives a reachability invocation request from the SMF. The AMF feeds back a remaining invocation count of idle UE to the SMF. The AMF may have the following feedback manners.

Alt1: When the remaining invocation count is 0, the AMF returns a current highest priority level and a current remaining count to the SMF.

Alt2: When a current remaining invocation count is not 0, if the AMF receives only one invocation request of the SMF, the AMF decreases the remaining count by 1, returns a new priority level and a new remaining count to the SMF, and notifies another SMF of the new priority level and the new remaining count.

Alt3: If the AMF receives a plurality of invocation requests of the SMF, the AMF calculates only an invocation request for an ARP with a highest priority level, returns the ARP with the highest priority level and the remaining count to the SMF, and notifies another SMF of the ARP with the highest priority level and the remaining count. The AMF may further transmit expected duration. The SMF notifies the UPF of a paging priority level and an identifier that indicates whether to continue to send a DDN. Optionally, the AMF may further transmit expected duration and a buffer size.

As shown in FIG. 7A to FIG. 7D, that a system architecture includes network elements such as UE, an AMF, a PCF, an SMF-1, an SMF-N, a UPF-1, and a UPF-N is used as an example. A main implementation procedure of a request processing method provided in an embodiment of this application may include the following steps.

11.a: The PCF sends a limited reachability invocation count to the AMF.

The AMF may locally configure the limited reachability invocation count, or the PCF configures the limited reachability invocation count. For example, the limited count is set to 3.

11.b: The PCF sends a DDN limitation policy to the SMF-1.

11.c: The PCF sends a DDN limitation policy to the SMF-N.

Each SMF may locally configure the DDN limitation policy, or the PCF configures the DDN limitation policy. For example, the DDN limitation policy may be discarding a packet when a quantity of DDNs exceeds a limit.

12. The AMF selects the SMF-1, . . . , and the SMF-N to simultaneously serve the UE, and the UE enters an idle state.

The UE establishes a plurality of sessions. The AMF selects a plurality of SMFs to serve the UE. The UE enters the idle state.

13.a: The UPF-1 receives downlink data.

13.b: The UPF-1 has no N3 user plane tunnel address.

13.c: The UPF-1 sends a DDN to the SMF-1.

A UPF sends a DDN to an SMF when the UPF receives downlink data from a data network and the UPF has no N3 user plane tunnel address. The DDN carries a priority level of an ARP.

13.d: The SMF-1 sends a reachability service invocation request to the AMF.

After receiving the invocation request, the SMF-1 sends the reachability service invocation request to the AMF.

After receiving the invocation request, the AMF may calculate a remaining reachability service invocation count (which is referred to as a remaining count for short), and may separately perform the following scenario 1, scenario 2, and scenario 3 based on a value of the remaining count.

Scenario 1: The remaining count is equal to 0, and the AMF directly returns a current ARP with a highest priority level and the remaining count.

14.a: The AMF sends a reachability service invocation response to the SMF-1.

14.b: The SMF-1 sends a DDN acknowledgement to the UPF-1.

The AMF checks remaining count limitation information. If the remaining count is 0, and a quantity of invocation operations exceeds a limit, the AMF sends a response to the SMF-1, and the response carries the current ARP with the highest priority level, the value of the remaining count, and an expected active time of the UE. If the SMF-1 detects that the remaining count is 0, the SMF-1 instructs the UPF to no longer send a DDN. If an extended buffer mechanism is used, the SMF sets a buffer time based on the expected active time of the UE, and instructs the UPF to start an extended buffer, and the buffer time and a buffer size are carried.

Unlimitedly, the AMF sends the reachability service invocation response to the SMF-1, and the reachability service invocation response may further include a first time period. After receiving the reachability service invocation response, the SMF-1 no longer sends an invocation request to the AMF within the first time period, to avoid overload of a network element in a core network.

Scenario 2: The remaining count is greater than 0, one reachability service invocation request of the SMF is received, and the AMF notifies all SMFs of an ARP with a highest priority level and the remaining count.

15.a: The AMF updates the ARP with the highest priority level and the remaining count.

15.b: The AMF sends a reachability service invocation response to the SMF-1.

15.c: The SMF-1 determines, based on the remaining count, whether to send a DDN.

16.a: The AMF finds another SMF associated with the UE, and notifies the SMF of the update.

16.b: The AMF sends a DDN trigger notification to the SMF-N.

16.c: The SMF-N determines, based on the remaining count, whether to send a DDN.

16.d: The SMF-N sends a DDN trigger notification to the UPF-N.

The AMF checks remaining count limitation information. If the remaining count is not 0, and the AMF receives only one invocation request of an SMF, the AMF decreases the remaining count by 1, and returns a new priority level and a new remaining count to the SMF. The SMF then determines, based on the remaining count, whether a DDN can continue to be sent, and notifies the UPF of a result of determining.

Scenario 3: The remaining count is greater than 0, a plurality of reachability service invocation requests of the SMF are received, and the AMF notifies all SMFs of an ARP with a highest priority level and the remaining count.

17.a: The UPF-N receives downlink data.

17.b: The UPF-N generates a DDN when the UPF-N has no N3 user plane tunnel address and receives no indication and a priority level of an ARP is higher than that of a processed ARP.

17.c: The UPF-N sends the DDN to the SMF-N.

17.d: The SMF-N sends a reachability service invocation request to the AMF.

18.a: The AMF determines whether an ARP of the received request is higher than the highest priority level.

18.b: The AMF sends a reachability service invocation response to the SMF-1.

18.c: The SMF-1 determines, based on the remaining count, whether to send a DDN.

18.d: The SMF-1 sends a DDN acknowledgement to the UPF-1.

19.a: The AMF sends a reachability service invocation response to the SMF-N.

19.b: The SMF-N determines, based on the remaining count, whether to send a DDN.

19.c: The SMF-N sends a reachability service invocation response to the UPF-N.

20.a: The AMF finds another SMF associated with the UE, and notifies the SMF of the update.

The AMF detects all the other SMFs of the UE, and notifies the other SMFs of a latest priority level and remaining count. The other SMFs then determine, based on the remaining count, whether a DDN can continue to be sent, and notify the UPF of a result of determining.

If the AMF receives a plurality of invocation requests of an SMF, the AMF calculates only invocation requests with different priority levels. If a quantity of invocation requests with different priority levels is not less than the remaining count, the remaining count is 0; or if a quantity of invocation requests with different priority levels is less than the remaining count, the AMF correspondingly updates the remaining count, returns an ARP with a highest priority level and the remaining count to the SMF, and notifies another SMF of the ARP with the highest priority level and the remaining count. The AMF may also transmit expected duration. The SMF then determines, based on the remaining count, whether a DDN can continue to be sent, and notifies the UPF of a highest ARP priority level and an identifier that indicates whether to continue to send a DDN. Optionally, the AMF may further transmit expected duration and a buffer size.

21. The AMF resumes the remaining count of the UE when the UE enters a connected state; or when the UE is unsuccessfully paged, the AMF resumes the remaining count of the UE and starts a data processing policy.

In this embodiment, the AMF coordinates, among a plurality of SMFs serving the UE, quantities of DDNs of the UE based on a limited reachability service invocation count of the UE. In addition, the AMF updates, in a timely manner, the remaining count of the UE in the idle state and the highest priority level of the ARP on the SMF. In this embodiment, the AMF needs to be capable of recording a reachability service invocation count of the UE in the idle state, coordinating quantities of invocation requests from SMFs, and controlling load of the AMF and a paging operation in a RAN.

As shown in FIG. 8A to FIG. 8D, that a system architecture includes network elements such as UE, an AMF, a PCF, an SMF-1, an SMF-N, a UPF-1, and a UPF-N is used as an example. A difference between this embodiment shown in FIG. 8A to FIG. 8D and the foregoing embodiment lies in the following: After receiving a reachability service invocation request for the UE from an SMF, the AMF sends a limit over indication to the SMF or another related SMF only when a reachability service invocation count of the UE exceeds a limit. The limit over indication may include another necessary parameter, such as expected duration. The SMF receives the limit over indication, and instructs the UPF to no longer send a DDN. The AMF notifies the SMF of the limit over indication only when a remaining count is 0. Therefore, cell transmission can be reduced. Specifically, the embodiment shown in FIG. 8A to FIG. 8D mainly includes the following steps.

31.a: The PCF sends a limited reachability invocation count to the AMF.

The AMF may locally configure the limited reachability invocation count, or the PCF configures the limited reachability invocation count. For example, the limited count is set to 3.

31.b: The PCF sends a DDN limitation policy to the SMF-1.

31.c: The PCF sends a DDN limitation policy to the SMF-N.

Each SMF may locally configure the DDN limitation policy, or the PCF configures the DDN limitation policy. For example, the DDN limitation policy may be discarding a packet when a quantity of DDNs exceeds a limit.

32. The AMF selects the SMF-1, . . . , and the SMF-N to simultaneously serve the UE, and the UE enters an idle state.

33.a: The UPF-1 receives downlink data.

33.b: The UPF-1 has no N3 user plane tunnel address.

33.c: The UPF-1 sends a DDN to the SMF-1.

33.d: The SMF-1 sends a reachability service invocation request to the AMF.

After receiving an invocation request, the SMF-1 sends the reachability service invocation request to the AMF.

After receiving the invocation request, the AMF may calculate a remaining reachability service invocation count (which is referred to as a remaining count for short), and may separately perform the following scenario 1, scenario 2, and scenario 3 based on a value of the remaining count.

Scenario 1: The remaining count is equal to 0, and the AMF directly returns a current ARP with a highest priority level and the remaining count.

34.a: The AMF sends a reachability service invocation response to the SMF-1.

34.b: The SMF-1 sends a DDN acknowledgement to the UPF-1.

The AMF checks remaining count limitation information. If the remaining count is 0, and a quantity of invocation operations exceeds a limit, the AMF sends a response to the SMF-1, and returns a limit over indication. The limit over indication includes an expected active time of the UE. The SMF-1 detects the limit over indication, and instructs the UPF to no longer send a DDN. If an extended buffer mechanism is used, the SMF sets a buffer time based on the expected active time of the UE, and instructs the UPF to start an extended buffer, and the buffer time and a buffer size are carried.

Unlimitedly, the AMF sends the reachability service invocation response to the SMF-1, and the reachability service invocation response may further include a first time period. After receiving the reachability service invocation response, the SMF-1 no longer sends an invocation request to the AMF within the first time period, to avoid overload of a network element in a core network.

Scenario 2: The remaining count is greater than 0, one reachability service invocation request of the SMF is received, and the AMF notifies all SMFs of an ARP with a highest priority level and the remaining count.

35.a: The AMF updates the ARP with the highest priority level and the remaining count, and returns a limit over indication if the remaining count is equal to 0.

35.b: The AMF sends a reachability service invocation response to the SMF-1.

35.c: The SMF-1 determines, according to the limit over indication, whether to send a DDN.

35.d: The SMF-1 sends a DDN acknowledgement to the UPF-1.

36.a: If the remaining count is equal to 0, the AMF finds another SMF associated with the UE, and notifies the SMF of the update.

36.b: The AMF sends a DDN trigger notification to the SMF-N.

36.c: The SMF-N determines, according to the limit over indication, whether to send a DDN.

36.d: The SMF-N sends a DDN trigger notification to the UPF-N.

The AMF checks remaining count limitation information. If the remaining count is not 0, and the AMF receives only one invocation request of an SMF, the AMF decreases the remaining count by 1, and returns a new priority level to the SMF. Alternatively, if the remaining count is 0, the AMF returns the limit over indication. The limit over indication includes an expected active time of the UE. The SMF detects the limit over indication, and instructs the UPF to no longer send a DDN. If an extended buffer mechanism is used, the SMF sets a buffer time based on the expected active time of the UE in step 4, and instructs the UPF to start an extended buffer, and the buffer time and a buffer size are carried.

Scenario 3: The remaining count is greater than 0, a plurality of reachability service invocation requests of the SMF are received, and the AMF notifies all SMFs of an ARP with a highest priority level and the remaining count.

37.a: The UPF-N receives downlink data.

37.b: The UPF-N generates a DDN when the UPF-N has no N3 user plane tunnel address and receives no indication and a priority level of an ARP is higher than that of a processed ARP.

37.c: The UPF-N sends the DDN to the SMF-N.

37.d: The SMF-N sends a reachability service invocation request to the AMF.

38.a: The AMF determines whether an ARP of the received request is higher than the highest priority level, and returns a limit over indication if the remaining count is equal to 0.

38.b: The AMF sends a reachability service invocation response to the SMF-1.

38.c: The SMF-1 determines, according to the limit over indication, whether to send a DDN.

38.d: The SMF-1 sends a DDN acknowledgement to the UPF-1.

39.a: The AMF sends a reachability service invocation response to the SMF-N.

39.b: The SMF-N determines, according to the limit over indication, whether to send a DDN.

39.c: The SMF-N sends a reachability service invocation response to the UPF-N.

40.a: The AMF finds another SMF associated with the UE, and notifies the SMF of the update.

The AMF detects all the other SMFs of the UE, and notifies the other SMFs of a latest priority level or the limit over indication. The other SMFs then determine, according to the limit over indication, whether a DDN can continue to be sent, and notify the UPF of a result of determining.

If the AMF receives a plurality of invocation requests of the SMF, the AMF calculates only invocation requests with different priority levels. If a quantity of invocation requests with different priority levels is not less than the remaining count, the remaining count is 0; or if a quantity of invocation requests with different priority levels is less than the remaining count, the AMF correspondingly updates the remaining count. If the count is not 0, the AMF returns the ARP with the highest priority level; or if the count is 0, the AMF returns the limit over indication. The limit over indication includes an expected active time of the UE. The SMF detects the limit over indication, and instructs the UPF to no longer send a DDN. If an extended buffer mechanism is used, the SMF sets a buffer time based on the expected active time of the UE in step 4, and instructs the UPF to start an extended buffer, and the buffer time and a buffer size are carried.

41. The AMF resumes the remaining count of the UE when the UE enters a connected state; or when the UE is unsuccessfully paged, the AMF resumes the remaining count of the UE and starts a data processing policy.

Figure 8A:
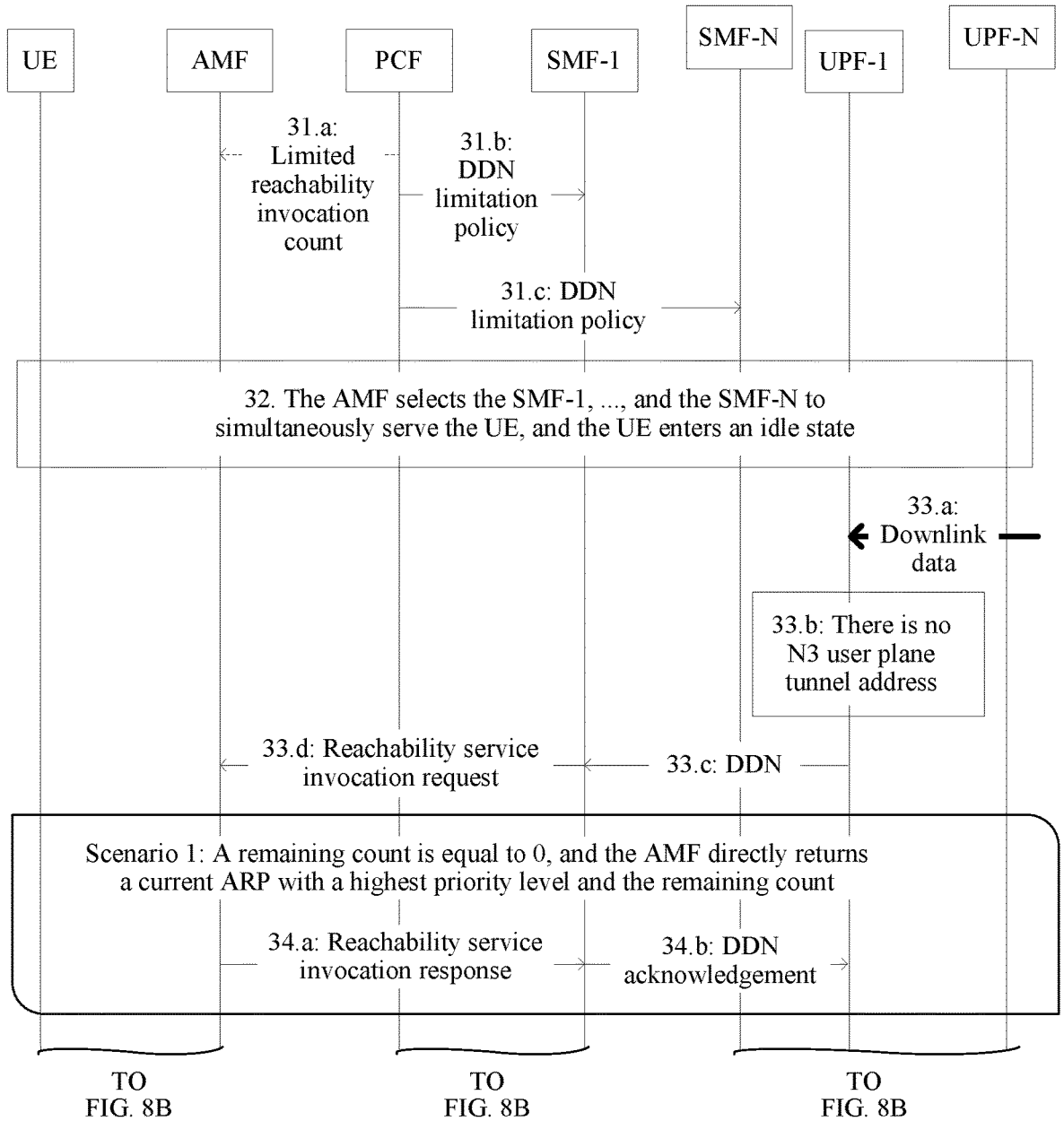
FIG. 8A to FIG. 8D are a schematic diagram of another implementation scenario to which a request processing method is applied according to an embodiment of this application.
Figure 8B:
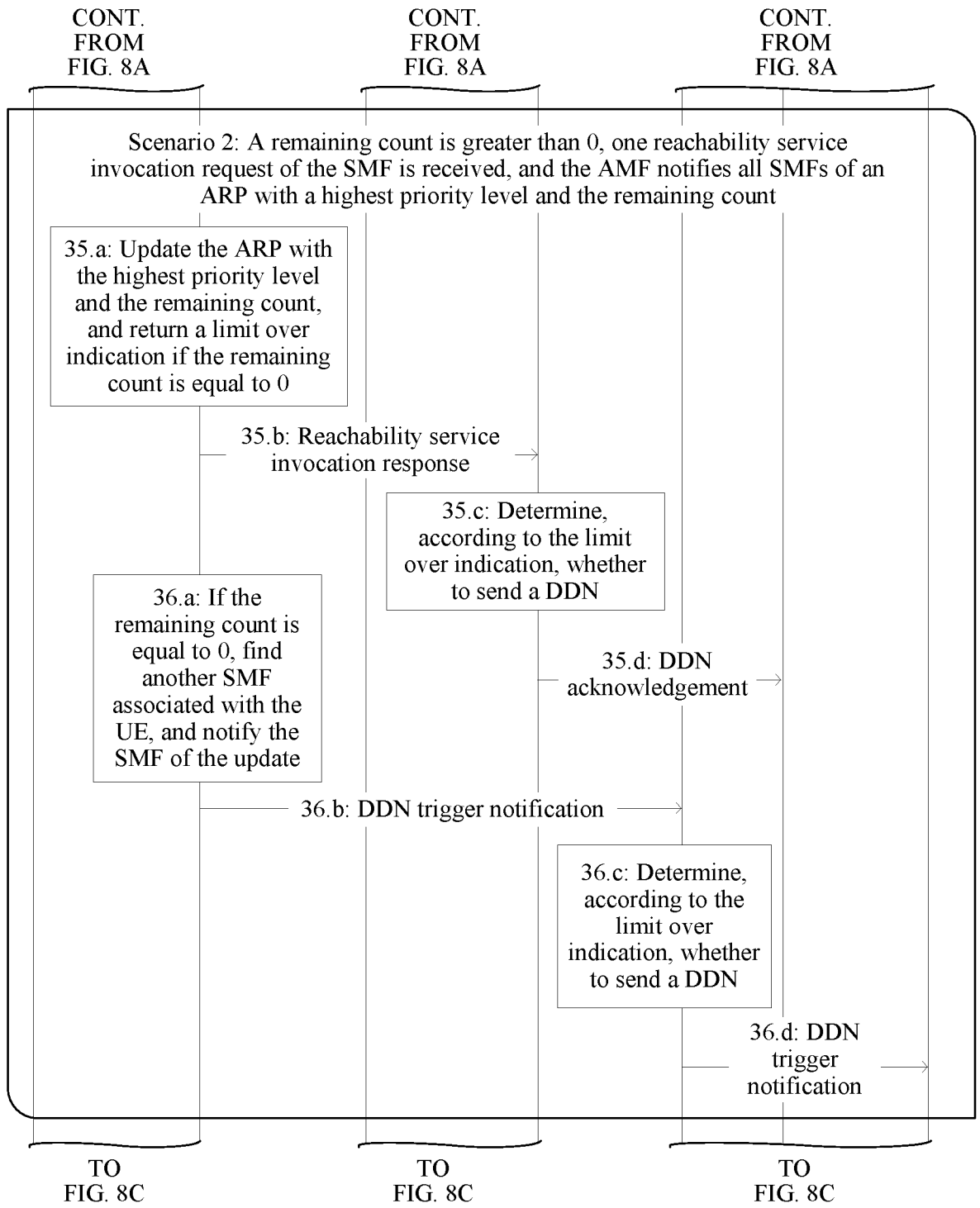
Figure 8C:
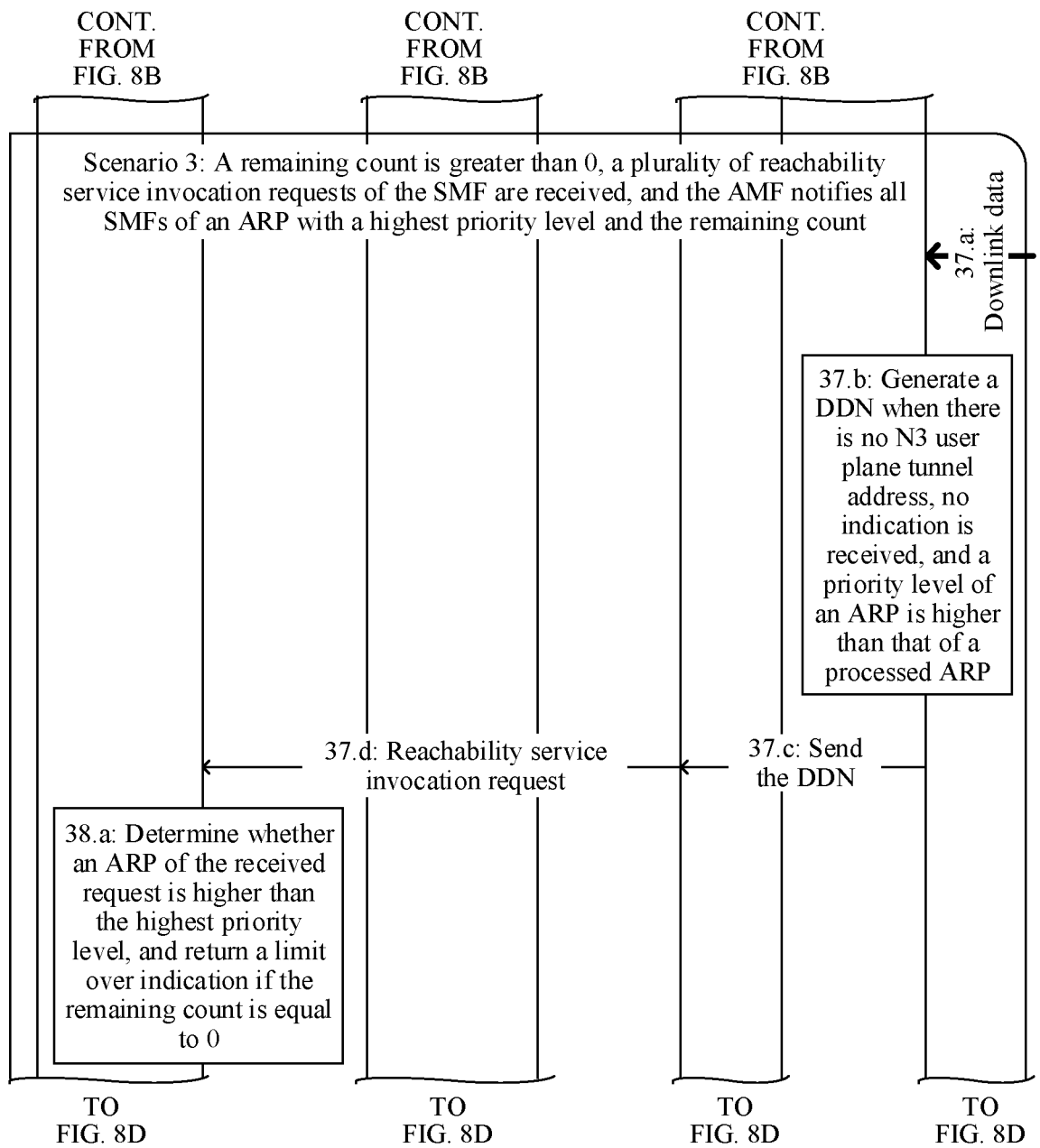
Figure 8D:
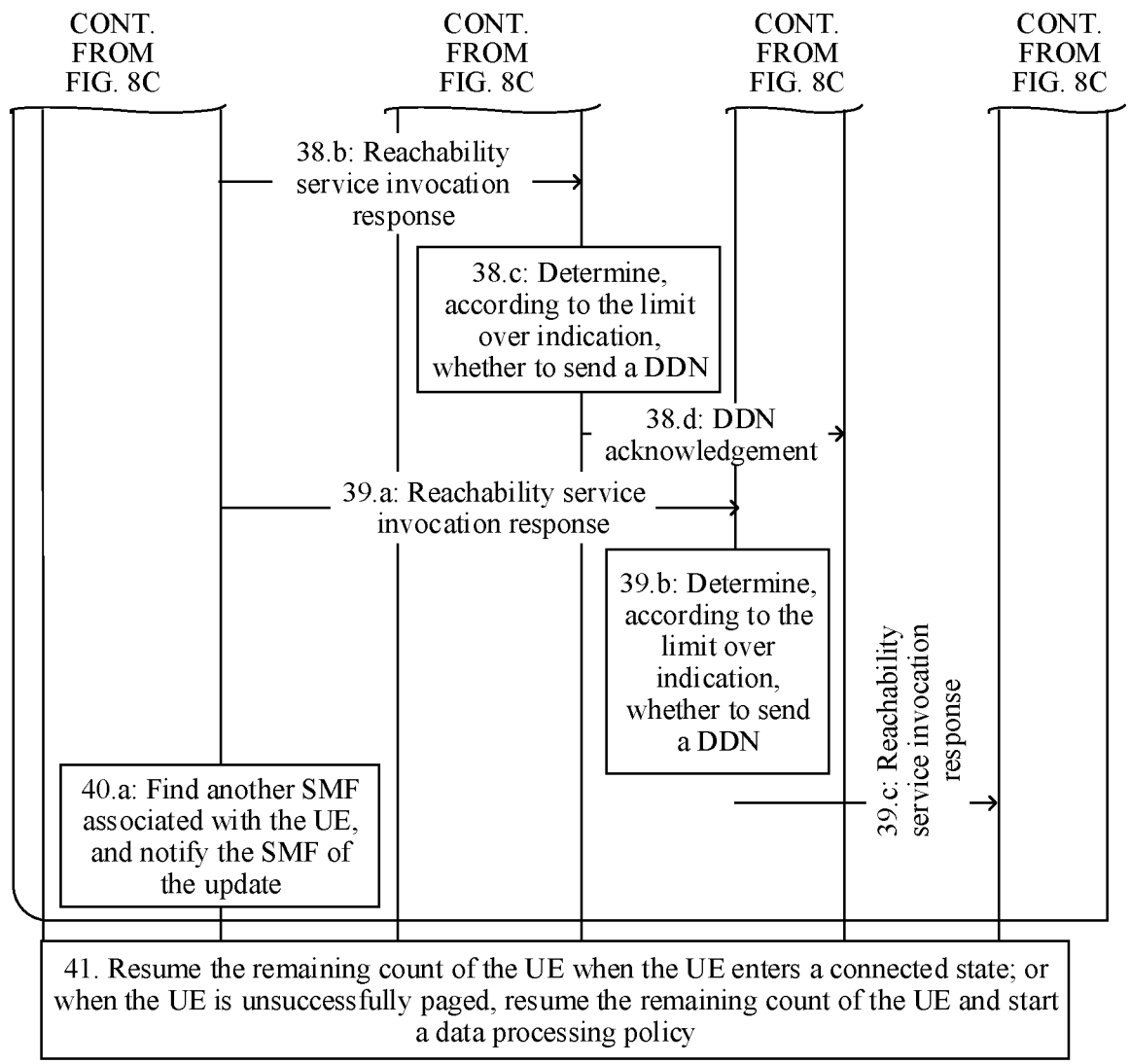

Technical effects of this embodiment are basically the same as those of the embodiment shown in FIG. 8A to FIG.

8D, except that information exchanged between the AMF and the SMF varies as the value of the remaining count varies.

The embodiments of this application provide a solution of controlling a reachability service invocation count on the AMF and a quantity of DDNs sent on the SMF, to avoid overload of the AMF, the SMF, and the RAN caused by an excessive quantity of reachability service invocation operations for the UE in the idle state and an excessive quantity of DDNs.

It should be noted that for brief description, the foregoing method embodiments are represented as a series of actions. However, a person skilled in the art should appreciate that this application is not limited to the described order of the actions, because according to this application, some steps may be performed in other orders or simultaneously. It should be further appreciated by a person skilled in the art that the embodiments described in this specification all belong to examples of embodiments, and the used actions and modules are not necessarily required in this application.

To better implement the foregoing solutions of the embodiments of this application, the following further provides related apparatuses for implementing the foregoing solutions.

Referring to FIG. 9-*a*, an access and mobility management function entity AMF 900 provided in an embodiment of this application may include a receiving module 901 and a processing module 902.

The processing module 902 is configured to determine a first control plane function entity for a terminal device.

The processing module 902 is configured to determine that the terminal device enters an idle state.

The receiving module 901 is configured to obtain a first reachability service invocation request from the first control plane function entity, where the first reachability service invocation request is used to request the AMF 300 to page the terminal device that enters the idle state.

The processing module 902 is configured to reject the first reachability service invocation request when the AMF determines, based on the first reachability service invocation request, that a reachability service invocation limitation condition is satisfied.

In some embodiments of this application, the reachability service invocation limitation condition includes at least one of the following conditions: a reachability service invocation count limitation condition, a reachability service invocation frequency limitation condition, a service attribute limitation condition, a user configuration limitation condition, and a reachability service invocation-limited time period condition.

In some embodiments of this application, the reachability service invocation limitation condition further includes a priority level limitation condition for an allocation retention priority ARP.

In some embodiments of this application, the first reachability service invocation request includes a first ARP.

The receiving module 901 is further configured to obtain a second reachability service invocation request from the second control plane function entity, where the second reachability service invocation request includes a second ARP, and the second control plane function entity is another control plane function entity that is different from the first control plane function entity and that is determined by the AMF for the terminal device.

The processing module 902 is further configured to reject the first reachability service invocation request when a priority level of the second ARP is higher than a priority level of the first ARP.

In some embodiments of this application, the first reachability service invocation request includes a first ARP.

The priority level limitation condition for the ARP includes: not higher than a highest priority level of an ARP of a reachability service invocation request processed by the AMF.

The processing module 902 is specifically configured to reject the first reachability service invocation request when a priority level of the first ARP is lower than or equal to the highest priority level of the ARP of the processed reachability service invocation request.

In some embodiments of this application, the processing module 902 is specifically configured to send a reachability service invocation reject message to the first control plane function entity.

In some embodiments of this application, the reachability service invocation reject message includes at least one of the following information: information indicating that a limited reachability service invocation count is equal to 0, information about a first time period, limit over indication information, and information about the highest priority level of the ARP of the reachability service invocation request processed by the AMF, where the information about the first time period is used to indicate that the first control plane function entity shall not send a reachability service invocation request within the first time period.

In some embodiments of this application, as shown in FIG. 9-*b*, the AMF 900 further includes:

a sending module 903, configured to send a notification message to a third control plane function entity, where the notification message includes at least one of the following information: information indicating that a limited reachability service invocation count is equal to 0, information about a first time period, limit over indication information, and information about the highest priority level of the ARP of the reachability service invocation request processed by the AMF, where the information about the first time period is used to indicate that the first control plane function entity shall not send a reachability service invocation request within the first time period, and the third control plane function entity is another control plane function entity that is different from the first control plane function entity and that is determined by the AMF for the terminal device.

In some embodiments of this application, the processing module 902 is configured to accept the first reachability service invocation request when the AMF determines, based on the first reachability service invocation request, that the reachability service invocation limitation condition is not satisfied.

In some embodiments of this application, the processing module 902 is specifically configured to send a reachability service invocation accept message to the first control plane function entity.

In some embodiments of this application, the reachability service invocation accept message includes information about a remaining reachability service invocation count, and/or information about a highest priority level of an ARP of a reachability service invocation request processed by the AMF.

The information about the remaining reachability service invocation count is obtained through calculation by the AMF based on a limited reachability service invocation count and the first reachability service invocation request.

In some embodiments of this application, as shown in FIG. 9-b, the AMF further includes a sending module 903.

The receiving module 901 is further configured to obtain a status update message of the terminal device, where the status update message includes: the terminal device enters a connected state, or the terminal device is unsuccessfully paged.

The sending module 903 is configured to send the status update message to the first control plane function entity.

In some embodiments of this application, the sending module 903 is further configured to send the status update message to a third control plane function entity, where the third control plane function entity is another control plane function entity that is different from the first control plane function entity and that is determined by the AMF for the terminal device.

In some embodiments of this application, the reachability service invocation limitation condition is determined according to a local configuration policy of the AMF; or the reachability service invocation limitation condition is determined by using reachability service invocation limitation information received by the AMF from a policy control function entity PCF.

Referring to FIG. 10, an embodiment of this application provides a control plane function entity. The control plane function entity is specifically a first control plane function entity 1000. The first control plane function entity 1000 includes:

a receiving module 1001, configured to obtain a data notification;

a processing module 1002, configured to generate a first reachability service invocation request based on the data notification and a historical reachability service invocation limitation condition stored in the first control plane function entity 1000; and a sending module 1003, configured to send the first reachability service invocation request to an access and mobility management function entity AMF.

In some embodiments of this application, the receiving module 1001 is further configured to: after the sending module sends the first reachability service invocation request to the access and mobility management function entity AMF, receive a reachability service invocation reject message or a reachability service invocation accept message from the AMF.

The processing module 1002 is further configured to update the historical reachability service invocation limitation condition based on the reachability service invocation reject message or the reachability service invocation accept message.

In some embodiments of this application, the reachability service invocation reject message includes at least one of the following information: information indicating that a limited reachability service invocation count is equal to 0, information about a first time period, limit over indication information, and information about a highest priority level of an ARP of a reachability service invocation request processed by the AMF. The information about the first time period is used to indicate that the first control plane function entity shall not send a reachability service invocation request within the first time period.

The reachability service invocation accept message includes information about a remaining reachability service invocation count, and/or information about a highest priority level of an ARP of a reachability service invocation request processed by the AMF.

In some embodiments of this application, the receiving module 1001 is further configured to receive a status update message from the AMF, where the status update message includes: the terminal device enters a connected state, or the terminal device is unsuccessfully paged.

Figure 11:
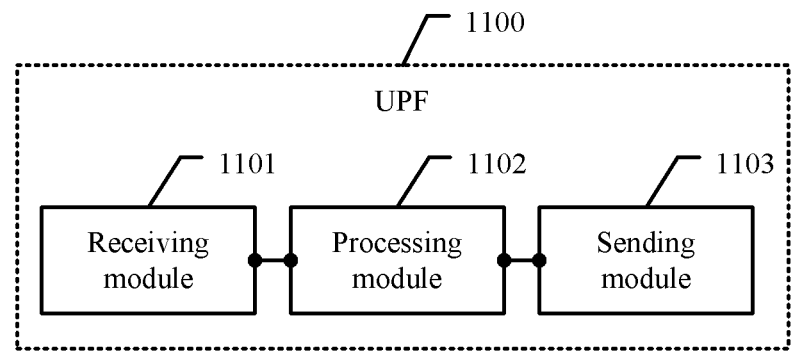
FIG. 11 is a schematic structural composition diagram of a UPF according to an embodiment of this application.

Referring to FIG. 11, an embodiment of this application further provides a UPF 1100, including:

a receiving module 1101, configured to receive, from a data network DN, first downlink data that needs to be sent to a terminal device;

a processing module 1102, configured to generate a first DDN message based on the first downlink data and a historical reachability service invocation limitation condition; and a sending module 1103, configured to send the first DDN message to a first control plane function entity.

In some embodiments of this application, the first DDN message further includes an allocation retention priority ARP corresponding to the terminal device.

In some embodiments of this application, the receiving module 1101 is configured to: after the sending module 1103 sends the first DDN message to the first control plane function entity, receive a notification message from the first control plane function entity, where the notification message includes: the first control plane function entity does not allow generation of a DDN message.

In some embodiments of this application, the receiving module 1101 is configured to: after the sending module 1103 sends the first DDN message to the first control plane function entity, receive a reachability service invocation reject message or a reachability service invocation accept message from the first control plane function entity; and the processing module 1102 is configured to update the historical reachability service invocation limitation condition based on the reachability service invocation reject message or the reachability service invocation accept message.

In some embodiments of this application, the reachability service invocation reject message includes at least one of the following information: information indicating that a limited reachability service invocation count is equal to 0, information about a first time period, limit over indication information, and information about a highest priority level of an ARP of a reachability service invocation request processed by the AMF. The information about the first time period is used to indicate that the first control plane function entity shall not send a reachability service invocation request within the first time period; and the reachability service invocation accept message includes information about a remaining reachability service invocation count, and/or information about a highest priority level of an ARP of a reachability service invocation request processed by the AMF.

In some embodiments of this application, the receiving module 1101 is configured to: after the first DDN message is sent to the first control plane function entity, receive, from the DN, second downlink data that needs to be sent to the terminal device.

The processing module 1102 is configured to reject the second downlink data based on the reachability service invocation reject message.

It should be noted that content such as information exchange between the modules/units of the apparatus and the execution processes thereof is based on the same idea as the method embodiments of this application, and produces the same technical effects as the method embodiments of this application. For specific content, refer to the foregoing descriptions in the method embodiments of this application. Details are not described herein again.

An embodiment of this application further provides a computer storage medium. The computer storage medium stores a program. The program is used to perform some or all of the steps recorded in the foregoing method embodiments.

Figure 12:
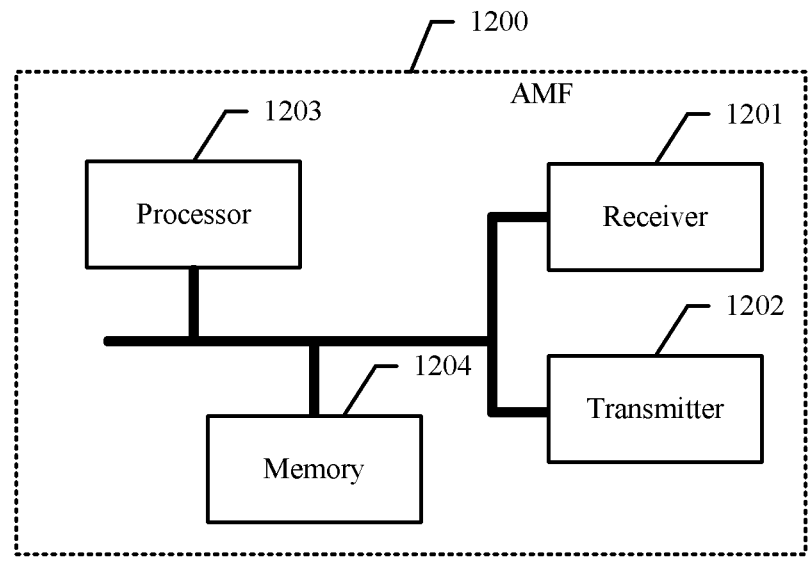
FIG. 12 is a schematic structural composition diagram of another AMF according to an embodiment of this application.

Another AMF provided in an embodiment of this application is described below. Referring to FIG. 12, the AMF 1200 includes:

a receiver 1201, a transmitter 1202, a processor 1203, and a memory 1204 (there may be one or more processors 1203 in the AMF 1200, and one processor is used as an example in FIG. 12). In some embodiments of this application, the receiver 1201, the transmitter 1202, the processor 1203, and the memory 1204 may be connected by using a bus or in another manner. In FIG. 12, connection by using the bus is used as an example.

The memory 1204 may include a read-only memory and a random access memory, and provide an instruction and data for the processor 1203. A part of the memory 1204 may further include a non-volatile random access memory (NVRAM). The memory 1204 stores an operating system and an operation instruction, an executable module or a data structure, a subnet thereof, or an extended set thereof. The operation instruction may include various operation instructions to implement various operations. The operating system may include various system programs to implement various basic services and process hardware-based tasks.

The processor 1203 controls an operation of the AMF 1200. The processor 1203 may also be referred to as a central processing unit (CPU). In specific application, components of the AMF 1200 are coupled together by using a bus system. In addition to a data bus, the bus system may include a power bus, a control bus, a status signal bus, and the like. However, for clear description, various types of buses in the figure are marked as the bus system.

The methods disclosed in the foregoing embodiments of this application may be applied to the processor 1203, or may be implemented by the processor 1203. The processor 1203 may be an integrated circuit chip and has a signal processing capability. In an implementation process, the steps in the foregoing methods may be implemented by using a hardware integrated logic circuit in the processor 1203, or by using instructions in a form of software. The processor 1203 may be a general purpose processor, a digital signal processor (DSP), an application-specific integrated circuit (ASIC), a field-programmable gate array (FPGA) or another programmable logic device, a discrete gate or transistor logic device, or a discrete hardware component. The processor 1203 may implement or perform the methods, the steps, and the logical block diagrams that are disclosed in the embodiments of this application. The general purpose processor may be a microprocessor, or the processor may be any conventional processor or the like. Steps of the methods disclosed with reference to the embodiments of this application may be directly performed and completed by using a hardware decoding processor, or may be performed and completed by using a combination of hardware and software modules in a decoding processor. A software module may be located in a mature storage medium in the art, such as a random access memory, a flash memory, a read-only memory, a programmable read-only memory, an electrically erasable programmable memory, or a register. The storage medium is located in the memory 1204, and the processor 1203 reads information in the memory 1204 and performs the steps in the foregoing methods in combination with hardware of the processor.

The receiver 1201 may be configured to: receive digital or character information that is input, and generate signal input related to a related setting and function control of the AMF. The transmitter 1202 may include a display device such as a display screen. The transmitter 1202 may be configured to output digital or character information through an external interface.

In this embodiment of this application, the processor 1203 is configured to perform the request processing method performed by the foregoing AMF.

Figure 13:
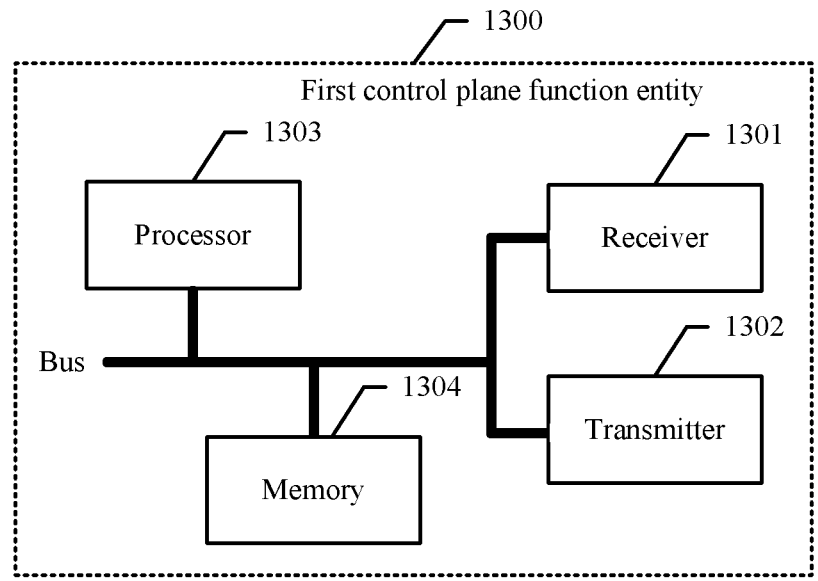
FIG. 13 is a schematic structural composition diagram of another first control plane function entity according to an embodiment of this application.

Another AMF provided in an embodiment of this application is described below. Referring to FIG. 13, a first control plane function entity 1300 includes:

a receiver 1301, a transmitter 1302, a processor 1303, and a memory 1304 (there may be one or more processors 1303 in the first control plane function entity 1300, and one processor is used as an example in FIG. 13). In some embodiments of this application, the receiver 1301, the transmitter 1302, the processor 1303, and the memory 1304 may be connected by using a bus or in another manner. In FIG. 13, connection by using the bus is used as an example.

The memory 1304 may include a read-only memory and a random access memory, and provide an instruction and data for the processor 1303. A part of the memory 1304 may further include an NVRAM. The memory 1304 stores an operating system and an operation instruction, an executable module or a data structure, a subnet thereof, or an extended set thereof. The operation instruction may include various operation instructions to implement various operations. The operating system may include various system programs to implement various basic services and process hardware-based tasks.

The processor 1303 controls an operation of the first control plane function entity 1300. The processor 1303 may also be referred to as a CPU. In specific application, components of the first control plane function entity are coupled together by using a bus system. In addition to a data bus, the bus system may include a power bus, a control bus, a status signal bus, and the like. However, for clear description, various types of buses in the figure are marked as the bus system.

The methods disclosed in the foregoing embodiments of this application may be applied to the processor 1303, or may be implemented by the processor 1303. The processor 1303 may be an integrated circuit chip and has a signal processing capability. In an implementation process, the steps in the foregoing methods may be implemented by using a hardware integrated logic circuit in the processor 1303, or by using instructions in a form of software. The processor 1303 may be a general purpose processor, a DSP, an ASIC, an FPGA or another programmable logic device, a discrete gate or transistor logic device, or a discrete hardware component. The processor 1303 may implement or perform the methods, the steps, and the logical block diagrams that are disclosed in the embodiments of this application. The general purpose processor may be a microprocessor, or the processor may be any conventional processor or the like. Steps of the methods disclosed with reference to the embodiments of this application may be directly performed and completed by using a hardware decoding processor, or may be performed and completed by using a combination of hardware and software modules in a decoding processor. A software module may be located in a mature storage medium in the art, such as a random access memory, a flash memory, a read-only memory, a programmable read-only memory, an electrically erasable programmable memory, or a register. The storage medium is located in the memory 1304, and the processor 1303 reads information in the memory 1304 and performs the steps in the foregoing methods in combination with hardware of the processor.

In this embodiment of this application, the processor 1303 is configured to perform the request processing method performed by the foregoing first control plane function entity.

Figure 14:
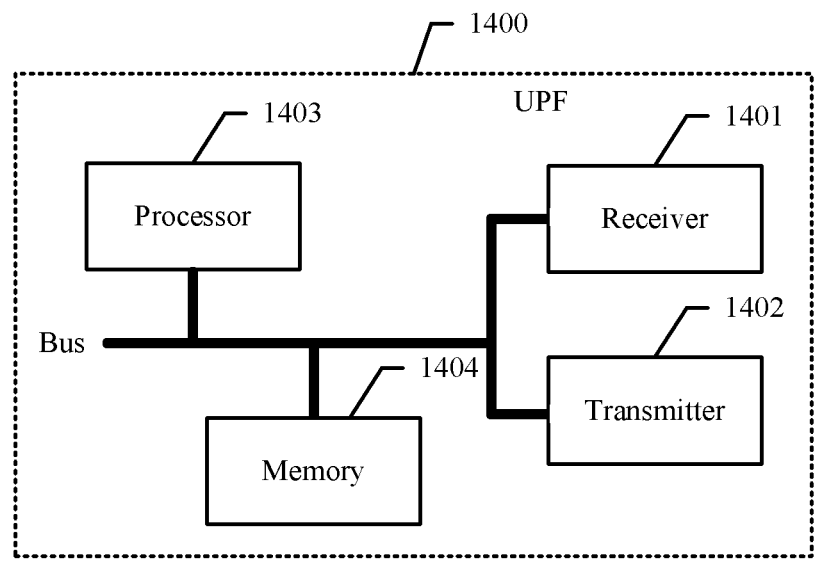
FIG. 14 is a schematic structural composition diagram of another UPF according to an embodiment of this application.

Another UPF provided in an embodiment of this application is described below. Referring to FIG. 14, the UPF 1400 includes:

a receiver 1401, a transmitter 1402, a processor 1403, and a memory 1404 (there may be one or more processors 1403 in the UPF 1400, and one processor is used as an example in FIG. 14). In some embodiments of this application, the receiver 1401, the transmitter 1402, the processor 1403, and the memory 1404 may be connected by using a bus or in another manner. In FIG. 14, connection by using the bus is used as an example.

The memory 1404 may include a read-only memory and a random access memory, and provide an instruction and data for the processor 1403. A part of the memory 1404 may further include an NVRAM. The memory 1404 stores an operating system and an operation instruction, an executable module or a data structure, a subnet thereof, or an extended set thereof. The operation instruction may include various operation instructions to implement various operations. The operating system may include various system programs to implement various basic services and process hardware-based tasks.

The processor 1403 controls an operation of the UPF 1400. The processor 1403 may also be referred to as a CPU. In specific application, components of the UPF 1400 are coupled together by using a bus system. In addition to a data bus, the bus system may include a power bus, a control bus, a status signal bus, and the like. However, for clear description, various types of buses in the figure are marked as the bus system.

The methods disclosed in the foregoing embodiments of this application may be applied to the processor 1403, or may be implemented by the processor 1403. The processor 1403 may be an integrated circuit chip and has a signal processing capability. In an implementation process, the steps in the foregoing methods may be implemented by using a hardware integrated logic circuit in the processor 1403, or by using instructions in a form of software. The processor 1403 may be a general purpose processor, a DSP, an ASIC, an FPGA or another programmable logic device, a discrete gate or transistor logic device, or a discrete hardware component. The processor 1403 may implement or perform the methods, the steps, and the logical block diagrams that are disclosed in the embodiments of this application. The general purpose processor may be a microprocessor, or the processor may be any conventional processor or the like. Steps of the methods disclosed with reference to the embodiments of this application may be directly performed and completed by using a hardware decoding processor, or may be performed and completed by using a combination of hardware and software modules in a decoding processor. A software module may be located in a mature storage medium in the art, such as a random access memory, a flash memory, a read-only memory, a programmable read-only memory, an electrically erasable programmable memory, or a register. The storage medium is located in the memory 1404, and the processor 1403 reads information in the memory 1404 and performs the steps in the foregoing methods in combination with hardware of the processor.

In this embodiment of this application, the processor 1403 is configured to perform the downlink data notification processing method performed by the foregoing UPF.

In another possible design, when the apparatus is a chip in a terminal, the chip includes a processing unit and a communications unit. The processing unit may be, for example, a processor. The communications unit may be, for example, an input/output interface, a pin, or a circuit. The processing unit may execute a computer executable instruction stored in a storage unit, so that the chip in the terminal performs the request processing method in any implementation of the first aspect. Optionally, the storage unit is a storage unit in the chip, for example, a register or a buffer. The storage unit may be alternatively a storage unit located outside the chip and in the terminal, for example, a read-only memory (ROM), or another type of static storage device that can store static information and an instruction, or a random access memory (RAM).

Any one of the processors mentioned above may be a general purpose central processing unit (CPU), a microprocessor, an application-specific integrated circuit (ASIC), or one or more integrated circuits that are configured to control execution of a program in the request processing method of the first aspect.

In addition, it should be noted that the described apparatus embodiments are merely examples. The units described as separate parts may or may not be physically separate, and parts shown as units may or may not be physical units, may be located in one position, or may be distributed on a plurality of network units. Some or all of the modules may be selected according to actual needs to achieve the objectives of the solutions of the embodiments. In addition, in the accompanying drawings of the apparatus embodiments provided in this application, connection relationships between modules indicate that the modules have communication connections to each other. This may be specifically implemented as one or more communications buses or signal cables.

Based on the descriptions of the foregoing implementations, a person skilled in the art may clearly understand that this application may be implemented by using software in addition to necessary universal hardware, or by using dedicated hardware, including a dedicated integrated circuit, a dedicated CPU, a dedicated memory, a dedicated component, and the like. Usually, any function that can be performed by a computer program can be easily implemented by using corresponding hardware. Moreover, a specific hardware structure used to implement a same function may be in various forms, for example, in a form of an analog circuit, a digital circuit, or a dedicated circuit. However, as for this application, a software program implementation is a better implementation in most cases. Based on such an understanding, the technical solutions of this application essentially or the part contributing to the prior art may be implemented in a form of a software product. The computer software product is stored in a readable storage medium, such as a floppy disk, a USB flash drive, a removable hard disk, a read-only memory (ROM), a random access memory (RAM), a magnetic disk, or a compact disc of a computer, and includes several instructions for instructing a computer device (which may be a personal computer, a server, a network device, or the like) to perform the methods described in the embodiments of this application.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer instructions are loaded and executed on a computer, the procedures or functions according to the embodiments of this application are all or partially generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

What is claimed is:

1. A request processing method carried out by a core network control plane, the method comprising:
   determining, by an access and mobility management function of the core network control plane, a plurality of control plane function entities for a terminal device, wherein each control plane function entity among the plurality of control plane function entities is configured to serve the terminal device;
   determining, by the access and mobility management function, that the terminal device is in an idle state;
   receiving, by the access and mobility management function, a first service invocation request from a first control plane function entity among the plurality of control plane function entities, wherein the first service invocation request comprises a first allocation retention priority (ARP), and wherein the first service invocation request is used to request the access and mobility management function to page the terminal device determined to be in the idle state; and
   processing, by the access and mobility management function in accordance with the determining that the terminal device is in the idle state, the first service invocation request, by:
      rejecting the first service invocation request in accordance with the first ARP being less than or equal to a level of a highest priority ARP of another service invocation request, among service invocation requests already processed by the access and mobility management function for the plurality of control plane function entities, used to request the access and mobility management function to page the terminal device determined to be in the idle state; and
      accepting the first service invocation request in accordance with the first ARP being greater than the level of the highest priority ARP of another service invocation request, among service invocation requests already processed by the access and mobility management function for the plurality of control plane function entities, used to request the access and mobility management function to page the terminal device determined to be in the idle state.

2. The method according to claim 1, wherein the rejecting the first service invocation request comprises:
   sending, by the access and mobility management function, a reject message to the first control plane function entity.

3. The method according to claim 2, wherein the reject message comprises information of an information type taken from the group consisting of:
   information about a first time period indicating that the first control plane function entity shall not send a request within the first time period, and
   information about the highest priority level of the ARP of the another service invocation request processed by the access and mobility management function.

4. The method according to claim 1, wherein the rejecting the first service invocation request is performed based on a local policy.

5. The method according to claim 1, wherein the method further comprises:
   receiving, by the first control plane function entity, a data notification;
   generating, by the first control plane function entity, the first service invocation request based on the data notification and based on a historical reachability service invocation limitation condition stored in the first control plane function entity; and
   sending, by the first control plane function entity, the first service invocation request to the access and mobility management function.

6. The method according to claim 5, wherein the generating, by the first control plane function entity, the first request based on the data notification and based on the historical reachability service invocation limitation condition stored in the first control plane function entity, comprises:
   generating the first service invocation request in accordance with a data notification priority associated with the data notification being higher than a previous data notification priority associated with a previous data notification message.

7. A network system including a core network control plane, the core network control plane comprising:
   a first control plane function entity; and
   an access and mobility management function in communication with the first control plane function entity, the access and mobility management function configured to carry out a method including:
      determining a plurality of control plane function entities for a terminal device, wherein each control plane function entity among the plurality of control plane function entities is configured to serve the terminal device;
      determining that the terminal device is in an idle state;
      receiving a first service invocation request from the first control plane function entity among the plurality of control plane function entities, wherein the first service invocation request comprises a first allocation retention priority (ARP), and wherein the first service invocation request is used to request the access and mobility management function to page the terminal device determined to be in the idle state; and processing, in accordance with the determining that the terminal device is in the idle state, the first service invocation request, by:

rejecting the first service invocation request in accordance with the first ARP being less than or equal to a level of a highest priority ARP of another service invocation request, among service invocation requests already processed by the access and mobility management function for the plurality of control plane function entities, used to request the access and mobility management function to page the terminal device determined to be in the idle state; and accepting the first service invocation request in accordance with the first ARP being greater than the level of the highest priority ARP of another service invocation request, among service invocation requests already processed by the access and mobility management function for the plurality of control plane function entities, used to request the access and mobility management function to page the terminal device determined to be in the idle state.

8. The system according to claim 7, wherein the access and mobility management function is configured to perform, in association with the rejecting the first service invocation request, sending a reject message to the first control plane function entity.

9. The system according to claim 8, wherein the reject message comprises information of an information type taken from the group consisting of:

information about a first time period indicating that the first control plane function entity shall not send a request within the first time period, and information about the highest priority level of the ARP of the another service invocation request processed by the access and mobility management function.

10. The system according to claim 7, wherein the rejecting the first request is performed based on a local policy.

11. The system according to claim 7, wherein the first control plane function entity is configured to carry out operations of:

receiving a data notification;

generating the first service invocation request based on the data notification and based on a historical reachability service invocation limitation condition stored in the first control plane function entity; and sending the first request to the access and mobility management function.

12. The system according to claim 11, wherein the generating the first service invocation request in accordance with a data notification priority associated with the data notification being higher than a previous data notification priority associated with a previous data notification message.

13. An access and mobility management function entity in a core network control plane, the access and mobility management function entity comprising: a processor and a memory, wherein the memory is configured to store an instruction; and the processor is configured to execute the instruction to carry out a method comprising:

determining a plurality of control plane function entity entities for a terminal device, wherein each control plane function entity among the plurality of control plane function entities is configured to serve the terminal device;

determining that the terminal device is in an idle state;

receiving a first service invocation request from a first control plane function entity among the plurality of control plane function entities, wherein the first service invocation request comprises a first allocation retention priority (ARP), and wherein the first service invocation request is used to request the access and mobility management function to page the terminal device determined to be in the idle state; and processing, in accordance with the determining that the terminal device is in the idle state, the first service invocation request, by:

rejecting the first service invocation request in accordance with the first ARP being less than or equal to a level of a highest priority ARP of another service invocation request, among service invocation requests already processed by the access and mobility management function for the plurality of control plane function entities, used to request the access and mobility management function to page the terminal device determined to be in the idle state; and accepting the first service invocation request in accordance with the first ARP being greater than the level of the highest priority ARP of another service invocation request, among service invocation requests already processed by the access and mobility management function for the plurality of control plane function entities, used to request the access and mobility management function to page the terminal device determined to be in the idle state.

14. The access and mobility management function entity of claim 13, wherein the rejecting the first service invocation request is performed based on a local policy.

15. The access and mobility management function entity of claim 13, wherein the rejecting the first service invocation request comprises:

sending, by the access and mobility management function, a reject message to the first control plane function entity.

16. The access and mobility management function entity of claim 15, wherein the reject message comprises information of an information type taken from the group consisting of:

information about a first time period indicating that the first control plane function entity shall not send a request within the first time period, and information about the highest priority level of the ARP of the another service invocation request processed by the access and mobility management function.

17. The access and mobility management function entity of claim 13, wherein the method further comprises:

receiving, by the first control plane function entity, a data notification;

generating, by the first control plane function entity, the first request based on the data notification and based on a historical reachability service invocation limitation condition stored in the first control plane function entity; and sending, by the first control plane function entity, the first request to the access and mobility management function.

18. The access and mobility management function entity of claim 17, wherein the generating, by the first control plane function entity, the first request based on the data notification and based on the historical reachability service invocation limitation condition stored in the first control plane function entity, comprises:
 generating the first request in accordance with a data notification priority associated with the data notification is higher than a previous data notification priority associated with a previous data notification message.

\* \* \* \* \*